(12) United States Patent
Klam

(10) Patent No.: US 11,513,343 B2
(45) Date of Patent: Nov. 29, 2022

(54) ENVIRONMENTAL SCANNING AND IMAGE RECONSTRUCTION THEREOF

(71) Applicant: FARO Technologies, Inc., Lake Mary, FL (US)

(72) Inventor: Ludwig Klam, Weissach im Tal (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 570 days.

(21) Appl. No.: 16/586,033

(22) Filed: Sep. 27, 2019

(65) Prior Publication Data

US 2021/0096359 A1  Apr. 1, 2021

(51) Int. Cl.
*G02B 26/08* (2006.01)
*G02B 26/10* (2006.01)
*H04N 5/225* (2006.01)
*G02B 5/08* (2006.01)
*G01B 11/24* (2006.01)

(52) U.S. Cl.
CPC ......... *G02B 26/105* (2013.01); *H04N 5/2258* (2013.01); *G01B 11/24* (2013.01); *G02B 5/08* (2013.01)

(58) Field of Classification Search
CPC ...... G02B 26/105; G02B 5/08; H04N 5/2258; G01B 11/24; G01S 17/42; G01S 17/86; G01S 17/89
See application file for complete search history.

(56) References Cited

U.S. PATENT DOCUMENTS

| | | | |
|---|---|---|---|
| 9,210,288 B2 | 12/2015 | Bridges et al. | |
| 9,551,575 B2 | 1/2017 | Bridges et al. | |
| 9,762,883 B2 | 9/2017 | Vollrath et al. | |
| 10,132,611 B2 | 11/2018 | Steffey et al. | |
| 10,458,783 B2 | 10/2019 | Wolke et al. | |
| 2015/0085079 A1 | 3/2015 | Gittinger et al. | |
| 2017/0176575 A1* | 6/2017 | Smits | G01S 17/48 |

\* cited by examiner

*Primary Examiner* — Euncha P Cherry
(74) *Attorney, Agent, or Firm* — Cantor Colburn LLP

(57) ABSTRACT

Methods and systems for capturing image information of an environment using a laser scanner are described. The systems include a rotatable mirror arranged to direct light received onto an imaging camera of the laser scanner. The mirror is rotatable relative to the imaging camera and the camera is stationary relative to a rotational axis of the mirror. The methods include rotating the mirror relative to the camera and capturing, via the camera, an image containing image information of the received light. Each pixel of the image contains image information of an accumulation of the received light along a corresponding trajectory during a mirror rotation and each individual trajectory has a trajectory that crosses another of the individual trajectories within the image.

29 Claims, 14 Drawing Sheets

Translation

2D→1D
Information is Lost

Rotation

2D→1D
Information is Lost

Rotation + Translation

2D→2D
Information is Preserved
Reconstruction is Possible

ENVIRONMENTAL SCANNING AND IMAGE RECONSTRUCTION THEREOF

BACKGROUND

The subject matter disclosed herein relates to systems and methods for measuring three-dimensional (3D) coordinates of a scanned environment, and in particular, to systems and methods for image reconstruction within the scanned environment.

A 3D imager is a portable device having a projector that projects light patterns on the surface of an object to be scanned. Typically the projector emits a coded or uncoded pattern. One or more cameras, having predetermined positions and alignment relative to the projector, record images of a light pattern on the surface of an object. The three-dimensional coordinates of elements in the light pattern can be determined by trigonometric methods, such as by using epipolar geometry.

Other types of devices may also be used to measure 3D coordinates, such as those that use time-of-flight techniques (e.g. laser trackers, laser scanners, time-of-flight cameras, etc.). These devices emit a light beam and measure the amount of time it takes for light to travel to the surface and return to the device to determine the distance. Typically, the time-of-flight scanner is stationary and includes mechanisms to rotate about two orthogonal axis to direct the light beam in a direction. By knowing the distance and the two angles, 3D coordinates may be determined.

During scanning operations, as described above, typical imaging is merely point cloud data (i.e., distance) with no image (e.g., color, gray-scale, etc.) associated therewith (e.g., image pixel data). If a color or other image-based rendition of a scanned environment is desired, post-processing and/or secondary imaging is required. For example, in a rotating mirror configuration, a second process of rotation-stop-color image may be performed after point-cloud data is obtained, and the color may be mapped to the point cloud data. Alternatively, one or more secondary cameras that capture color images may be employed to enable mapping of image data to the point cloud data. However, these configurations suffer from parallax issues that can result in a lack of color (image) information on parts of the point cloud.

However, for a rotating mirror configuration, where the color camera captures the pictures through the same mirror, there are no mechanisms for in-process color capturing and subsequent mapping during a laser scan, if the color camera is aligned. Capturing image information during a laser scan may result in highly blurred pictures if the mirror- and pan-axis rotates at high speed compared to the exposure time of the camera. The approach to deconvolve the pictures with a known motion blur kernel is unpromising not only because the deconvolution is an ill-posed and ill-conditioned problem but mainly due to the large kernel size. In the case of the laser scanner, the kernel size may be larger than the camera picture making a reconstruction via deconvolution impractical. Additionally, knowledge about the exact camera orientation during the rotation is required. Orientation uncertainties affect directly the reconstructed image information. Furthermore, rolling shutter effects make the reconstruction even more complicated. Hence, the need for an alternative image reconstruction method.

BRIEF DESCRIPTION

According to some embodiments, methods of capturing image information of an environment using a laser scanner having a rotatable mirror configured and disposed to receive light from the environment and to direct at least a portion of the received light onto an imaging camera of the laser scanner, the mirror being rotatable relative to the imaging camera, the imaging camera being stationary relative to a rotational axis of the mirror, are provided. The methods include rotating the mirror relative to the imaging camera and capturing, via the imaging camera, an image containing image information of the received light. Each pixel of the image contains image information of an accumulation of the received light along a corresponding individual trajectory during the defined duration of the mirror rotation, and each individual trajectory has a trajectory that crosses another of the individual trajectories within the image.

In addition to one or more of the features described above, or as an alternative, further embodiments of the methods may include synchronizing an exposure time of the imaging camera with a defined duration of the mirror rotation such that the image information of the image contains an average of the image information corresponding to the defined duration of the mirror rotation.

In addition to one or more of the features described above, or as an alternative, further embodiments of the methods may include reconstructing the captured image information of the image via a processing circuit response to executable instructions which when executed on the processing circuit solves a system of linear equations $\overleftrightarrow{A}\vec{x}=\vec{b}$ for $\vec{x}$, where: $\vec{z}$ is a vector of pixels on the image to be reconstructed; $\vec{b}$ is a vector of pixels of the image of captured image information captured by the imaging camera corresponding to the defined duration of the mirror rotation; and $\overleftrightarrow{A}$ is a matrix of known trajectory paths for each pixel of the image of captured image information captured by the imaging camera corresponding to the defined duration of the mirror rotation.

In addition to one or more of the features described above, or as an alternative, further embodiments of the methods may include that in the defined duration is one full rotation of the mirror.

In addition to one or more of the features described above, or as an alternative, further embodiments of the methods may include capturing three-dimensional data associated with the environment using the laser scanner.

In addition to one or more of the features described above, or as an alternative, further embodiments of the methods may include correlating the captured image information with the captured three-dimensional data.

In addition to one or more of the features described above, or as an alternative, further embodiments of the methods may include reconstructing a three-dimensional color map of the environment based on the correlated data.

In addition to one or more of the features described above, or as an alternative, further embodiments of the methods may include that the three-dimensional data is time-of-flight data.

In addition to one or more of the features described above, or as an alternative, further embodiments of the methods may include that the capturing of the three-dimensional data comprises projecting light at the mirror from within the laser scanner and detecting a reflection of the projected light at a receiver within the laser scanner.

In addition to one or more of the features described above, or as an alternative, further embodiments of the methods may include that the projected light is a laser.

In addition to one or more of the features described above, or as an alternative, further embodiments of the methods may include that the laser has a wavelength of 780 nm or 1150 nm.

In addition to one or more of the features described above, or as an alternative, further embodiments of the methods may include that the laser scanner is rotated about an axis that is perpendicular to the rotational axis of the mirror.

In addition to one or more of the features described above, or as an alternative, further embodiments of the methods may include that the rotation of the mirror about the rotational axis of the mirror is greater than the rotation of the laser scanner about the axis perpendicular to the rotational axis of the mirror.

In addition to one or more of the features described above, or as an alternative, further embodiments of the methods may include that the imaging camera is one of a color camera, a black-and-white camera, and an infrared camera.

In addition to one or more of the features described above, or as an alternative, further embodiments of the methods may include that the imaging camera comprises at least one of a complementary metal-oxide-semiconductor (CMOS) and a charge-coupled device (CCD).

In addition to one or more of the features described above, or as an alternative, further embodiments of the methods may include moving the laser scanner within the environment during the rotating and capturing operations.

According to some embodiments, systems for capturing image information of an environment are provided. The systems include a housing, a rotatable mirror arranged within the housing, and an imaging camera arranged relative to the rotatable mirror to capture light reflected off the rotatable mirror. The rotatable mirror is configured and disposed to receive light from the environment and to direct at least a portion of the received light onto the imaging camera, the rotatable mirror being rotatable relative to the imaging camera about a rotational axis of the mirror, the imaging camera being stationary relative to the rotational axis of the mirror, and the rotatable mirror and the imaging camera are configured and disposed relative to each other such that the imaging camera captures an image containing image information of the received light while the rotatable mirror is rotating. Each pixel of the image contains image information of an accumulation of the received light along a corresponding individual trajectory during the defined duration of the rotation, and each individual trajectory has a trajectory that crosses another of the individual trajectories within the image.

In addition to one or more of the features described above, or as an alternative, further embodiments of the systems may include that an exposure time of the imaging camera is synchronized with a defined duration of rotation of the rotatable mirror such that the image information of the image contains an average of the image information corresponding to the defined duration of the rotation.

In addition to one or more of the features described above, or as an alternative, further embodiments of the systems may include a processing circuit response to executable instructions which when executed on the processing circuit solves a system of linear equations $\overleftrightarrow{A}\vec{x}=\vec{b}$ for $\vec{x}$ to reconstruct the captured image information of the image, where: $\vec{x}$ is a vector of pixels on the image to be reconstructed; $\vec{b}$ is a vector of pixels of the image of captured image information captured by the imaging camera corresponding to the defined duration of the mirror rotation; and $\overleftrightarrow{A}$ is a matrix of known trajectory paths for each pixel of the image of captured image information captured by the imaging camera corresponding to the defined duration of the mirror rotation.

In addition to one or more of the features described above, or as an alternative, further embodiments of the systems may include a light emitter arranged within the housing and configured to project a projected light at the rotatable mirror and a light receiver arranged to receive a reflection of the projected light.

In addition to one or more of the features described above, or as an alternative, further embodiments of the systems may include that the light receiver is configured to capture three-dimensional data associated with the environment based on the reflected projected light.

In addition to one or more of the features described above, or as an alternative, further embodiments of the systems may include a processing circuit configured to correlate the captured image information with the captured three-dimensional data.

In addition to one or more of the features described above, or as an alternative, further embodiments of the systems may include a processing circuit configured to reconstruct a three-dimensional color map of the environment based on the correlated data.

In addition to one or more of the features described above, or as an alternative, further embodiments of the systems may include that the three-dimensional data is time-of-flight data.

In addition to one or more of the features described above, or as an alternative, further embodiments of the systems may include that the projected light is a laser.

In addition to one or more of the features described above, or as an alternative, further embodiments of the systems may include that the housing is rotated about an axis that is perpendicular to the rotational axis of the mirror.

In addition to one or more of the features described above, or as an alternative, further embodiments of the systems may include that the rotation of the mirror about the rotational axis of the mirror is greater than the rotation of the housing about the axis perpendicular to the rotational axis of the mirror.

In addition to one or more of the features described above, or as an alternative, further embodiments of the systems may include that the imaging camera is one of a color camera, a black-and-white camera, and an infrared camera.

In addition to one or more of the features described above, or as an alternative, further embodiments of the systems may include that the imaging camera comprises at least one of a complementary metal-oxide-semiconductor (CMOS) and a charge-coupled device (CCD).

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a three-dimensional (3D) measurement system that enables three dimensional mapping and imaging and also image reconstruction of such a scanned environment.

Figure 1A:
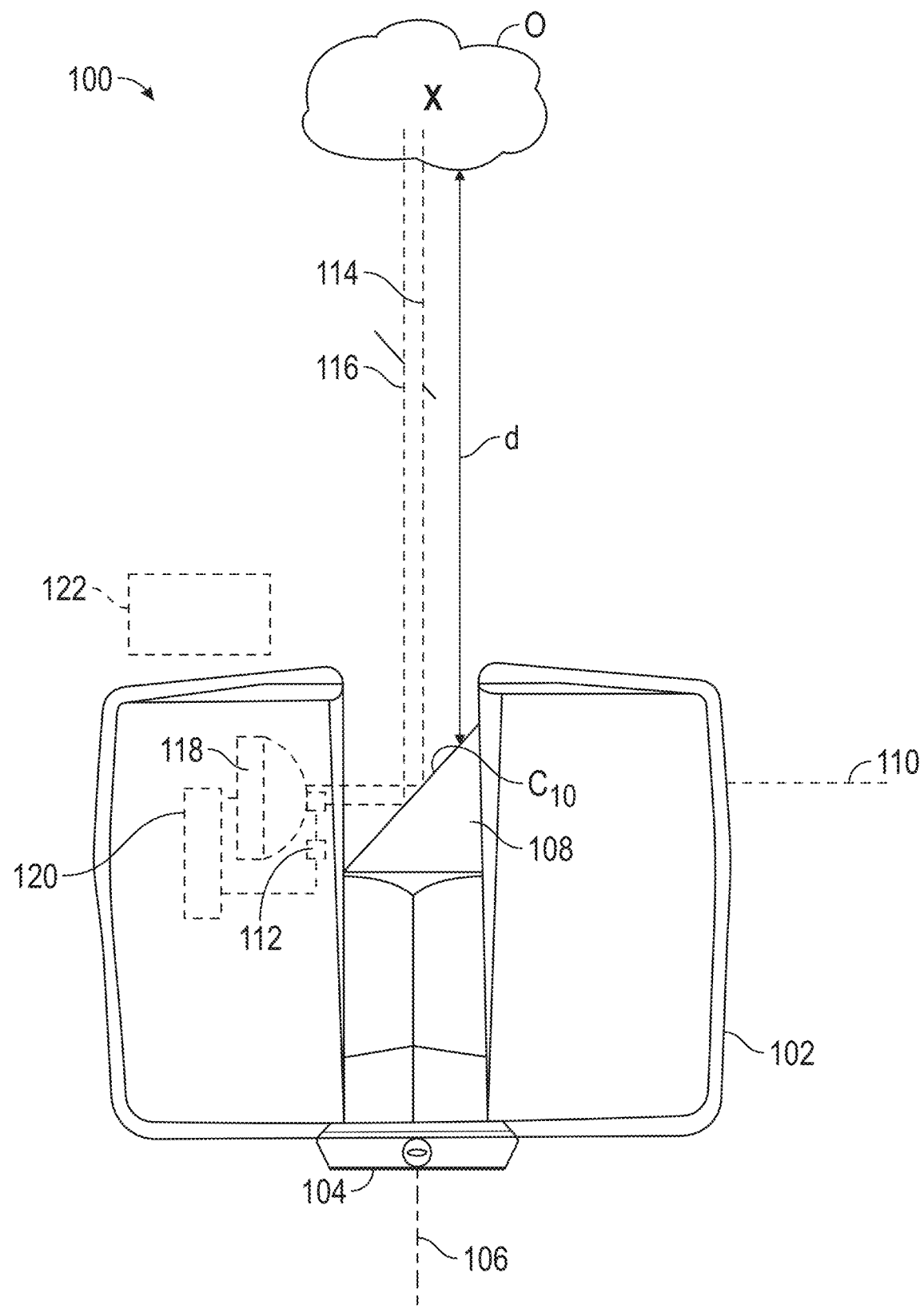
FIG. 1A is a side view of a 3D scanning system in accordance with an embodiment of the present disclosure.
Figure 1B:
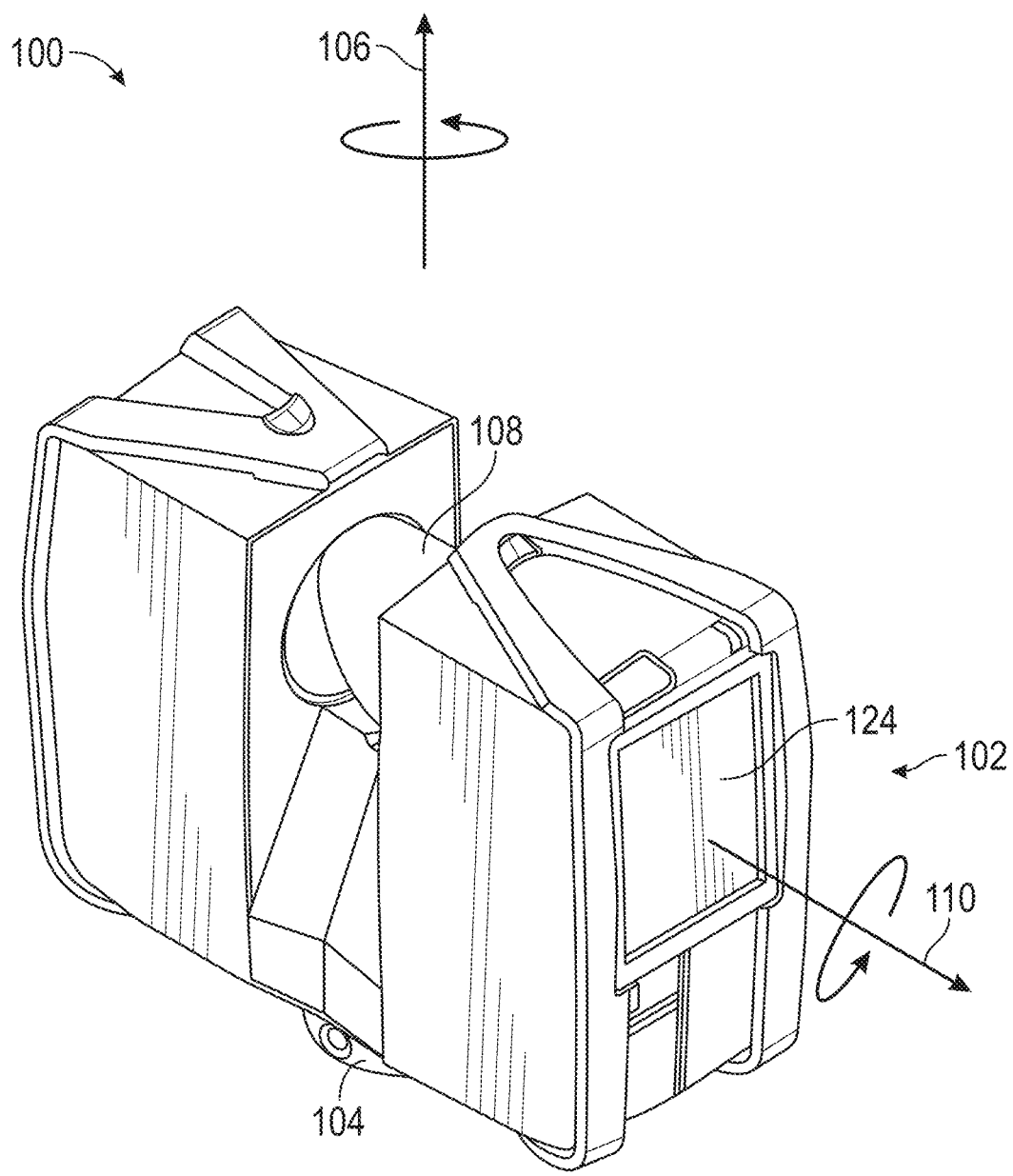
FIG. 1B is a perspective view of the 3D scanning system of FIG. 1A.

Referring to FIGS. 1A-1B, a 3D scanner 100 (e.g., a laser scanner) is shown. The 3D scanner 100 may be used for optically scanning and measuring a scanned environment using time-of-flight methods. The 3D scanner 100 comprises a measuring head or housing 102 and a base 104. The housing 102 is mounted on the base 104 such that the housing 102 can rotate with respect to the base 104 about a first axis 106, driven by a first rotary drive (e.g., a motor). The rotation about the first axis 106 may be about the center of the base 104. The housing 102 comprises a mirror 108, which can rotate about a second axis 110, driven by a second rotary drive (e.g., a motor). Referring to a normal upright position of the 3D scanner 100, the first axis 106 may be called the vertical axis or azimuth axis and the second axis 110 may be called the horizontal axis or zenith axis. The 3D scanner 100 may comprise a gimbal point or center $C_{10}$ to that is the intersection point of the first axis 106 and the second axis 110.

The housing 102 is provided with an electromagnetic radiation emitter 112, such as a light emitter, that emits an emission light beam 114. In an embodiment, the emission light beam 114 may be a coherent light such as a laser beam. As will be appreciated by those of skill in the art, the laser beam may have a wavelength range of approximately 300 to 1600 nanometers, for example, 790 nanometers, 905 nanometers, 1550 nanometers, or less than 400 nanometers. It should be appreciated that other electromagnetic radiation beams having greater or smaller wavelengths may also be used. The emission light beam 114 may be amplitude or intensity modulated, for example, with a sinusoidal waveform, rectangular waveform, etc. Alternatively, the emission light beam 114 may be otherwise modulated, for example, with a chirp signal, or coherent receiver methods may be used. In the present embodiment, the emission light beam 114 is a continuous wave laser beam. However, it may also be a pulsed laser. The emission light beam 114 is emitted by the light emitter 112 onto the mirror 108, where it is deflected to the environment of the 3D scanner 100.

A reflected light beam, hereinafter called a reception light beam 116, is reflected from the scanned environment by an object O that is within the scanned environment. The reflected or scattered light is intercepted by the rotary mirror 108 and directed onto a light receiver 118 with reception optics. The directions of the emission light beam 114 and the reception light beam 116 result from the angular positions of the housing 102 and the mirror 108 about the axes 106 and 110, respectively. The angular positions, in turn, depend on the corresponding rotary drives. The angle of rotation about the first axis 106 is measured by a first angular encoder. The angle of rotation about the second axis 110 is measured by a second angular encoder. The use of angular encoders is well understand and implementation thereof, along with the rotary drives or motors, will not be described further in order to simplify discussion of the present configuration.

A controller 120 is coupled to communicate with the light emitter 112 and the light receiver 118 inside the housing 102. It should be appreciated that while the controller 120 is illustrated as being a single device or circuit, this is for exemplary purposes and the claims should not be so limited. In other embodiments, the controller 120 may be comprised of a plurality of devices or circuits. In some embodiments, a portion of the controller 120 may be arranged outside the housing 102, for example, as a computer connected to the base 104 or other components of the 3D scanner 100.

The operation of the 3D scanner 100 is controlled by the controller 120. The controller 120 is a suitable electronic device capable of accepting data and instructions, executing the instructions to process the data, and, in some configurations, presenting the results. The controller 120 may accept instructions through a user interface, or through other means such as but not limited to electronic data card, voice activation means, manually-operable selection and control means, radiated wavelength and electronic or electrical transfer. The controller 120 may be and/or may include a microprocessor, microcomputer, a minicomputer, an optical computer, a board computer, a complex instruction set computer, an ASIC (application specific integrated circuit), a reduced instruction set computer, a computer network, a desktop computer, a laptop computer, a scientific computer, a scientific calculator, or a hybrid or combination of any of the foregoing.

The controller 120, in some embodiments, is capable of converting an analog voltage or current level provided by sensors (e.g., encoders) into digital signal(s). Alternatively, sensors may be configured to provide a digital signal to the controller 120, or an analog-to-digital (A/D) converter (not shown) maybe coupled between sensors and the controller 120 to convert the analog signal provided by sensors into a digital signal for processing by the controller 120. The controller 120 is configured to receive and use the digital signals as input to various processes for controlling the 3D scanner 100. The digital signals represent one or more system data including but not limited to angular position about the first axis 106, angular position about the second axis 110, time-of-flight of the light beams 114, 116, and the like.

In general, the controller 120 accepts data from sensors, light emitter 116 and light receiver 120, and is given certain instructions for the purpose of determining three-dimensional coordinates of points in the scanned environment. Further, the controller 120 may compare operational parameters to predetermined variances and if a predetermined variance is exceeded, the controller 120 can generate a signal that may be used to indicate an alarm to an operator. Additionally, the signal may initiate other control methods that adapt the operation of the laser scanner 100 such as changing or stopping the rotation about the first axis 106 once a predetermined angular position is achieved.

In some embodiments, the 3D scanner 100 may optionally include an imaging camera 122 that acquires two dimensional (2D) color images of the scanned environment as a scan is performed. The 2D images may be synchronized with the acquired 3D coordinate points obtained by the 3D scanner 100. This allows for the association of a color and/or a texture with the 3D coordinate point by the controller 120. In some embodiments, the imaging camera 122 is disposed internally to the laser scanner 100 and acquires images via the mirror 108.

In addition to being coupled to one or more components within the 3D scanner 100, the controller 120 may also be coupled to external computer networks such as a local area network (LAN) and/or the Internet. A LAN interconnects one or more remote computers, which are configured to communicate with the controller 120 using a well-known computer communications protocol such as TCP/IP (Transmission Control Protocol/Internet Protocol), RS-232, ModBus, and the like. Additional systems, similar to 3D scanner 100 (i.e., multiple scanners), may be connected to a LAN with respective controllers. Each of the systems may be configured to send and receive data to and from remote computers and other systems. In some embodiments, the LAN may be connected to the Internet. An Internet connection can allow the controller 120 to communicate with one or more remote computers or other systems connected to the Internet.

The controller 120, in one non-limiting example, includes a processor coupled to a random access memory device, a non-volatile memory device, a read-only memory (ROM) device, one or more input/output controllers and/or elements as known in the art, and an optional LAN interface device via a data communications bus. In embodiments having a LAN interface device, the LAN interface device provides for communication between the controller and a network in a data communications protocol supported by the network, as noted above. The ROM device can be configured to store an application code, e.g., main functionality firmware, including initializing parameters, and boot code, for the processor of the controller 120. Application code also includes program instructions for causing the processor to execute any operation control methods of the 3D scanner 100, including starting and stopping operation, changing operational states of the 3D scanner 100, monitoring predetermined operating parameters, generation of alarms, etc. In an embodiment, the application code can create an onboard telemetry system that may be used to transmit operating information between the 3D scanner 100 and one or more remote computers or receiving locations. The information to be exchanged with remote computers and the 3D scanner 100 can include but are not limited to 3D coordinate data and images associated with a scanned environment.

The non-volatile memory device may be any form of non-volatile memory such as an EPROM (Erasable Programmable Read Only Memory) chip, a disk drive, or the like. Stored in the non-volatile memory device may be various operational parameters for the application code. The various operational parameters can be input to non-volatile memory device either locally, using a user interface or through use of a remote computer, or remotely via the Internet using a remote computer. It will be recognized that application code can be stored in non-volatile memory device or the read-only memory device of the 3D scanner 100.

The controller may include operational control methods embodied in application code. The methods are embodied in computer instructions written to be executed by the processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C#, Objective-C, Java, Javascript ALGOL (algorithmic language), BASIC (beginners all-purpose symbolic instruction code), visual BASIC, ActiveX, HTML (HyperText Markup Language), Python, Ruby, and/or, for example, any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In an embodiment, the controller of the 3D scanner 100 may be configured to process data furnished to generate the 3D scans from images or data captured by the light receiver 118. The 3D scans in turn are joined or registered in a common coordinate frame of reference. For registering, known methods can be used, such as by identifying natural or artificial targets (i.e., recognizable structures within a scanned environment) in overlapping areas of two or more frames captured by the light receiver 118. In an embodiment, multiple frames may be dynamically registered using a local bundle adjustment method. Through identification of these targets, the assignment of two 3D scans may be determined by means of corresponding pairs. A whole scene (i.e., a plurality of frames) is thus gradually registered by the 3D scanner 100. In some embodiments, the individual frames may be registered to a point cloud generated by a laser scanner.

In an embodiment, the controller 120 further includes an energy source, such as battery. The battery may be an electrochemical device that provides electrical power for the controller 120. In an embodiment, the battery may also provide electrical power to the 3D scanner 100 (e.g., cameras, sensors, motors, projectors, etc.). In some embodiments, the battery may be separate from the controller 120 (e.g. a battery pack). In an embodiment, a second battery (not shown) may be disposed in the housing 102 to provide electrical power to the other components of the 3D scanner 100 (e.g., cameras, sensors, motors, projectors, etc.). Alternatively, in some embodiments, power may be supplied from an outlet or other continuous power source, as will be appreciated by those of skill in the art.

It should be appreciated that while the controller 120 is illustrated as being installed within the housing 102, this is for exemplary purposes and the claims should not be so limited. In other embodiments, the controller 120 may be separate from the housing 102. Further, while embodiments herein illustrate the controller 120 as being part of a single 3D scanner 100, this is for exemplary purposes and the claims should not be so limited. In other embodiments, the controller 120 may be coupled to and combine three-dimensional coordinate data from multiple 3D scanners 100.

Referring again to FIG. 1A, the controller 120 includes operation control methods embodied in application code. The controller 120 is configured to perform operational control methods that determine, for a multitude of measuring points X, a corresponding number of distances d between the 3D scanner 100 and the measuring points X on object O in the scanned environment. The distance to a particular measuring point X is determined based at least in part on the speed of light in air through which electromagnetic radiation propagates from the 3D scanner 100 to the measuring point X In an embodiment, the phase shift in a modulated light beam 114, 116 sent to the measuring point X and received from it, is determined and evaluated to obtain a measured distance d.

The speed of light in air depends on the properties of the air such as the air temperature, barometric pressure, relative humidity, and concentration of carbon dioxide. Such air properties influence the index of refraction of the air. The speed of light in air is equal to the speed of light in vacuum divided by the index of refraction. A laser scanner of the type discussed herein is based on the time-of-flight of the light in the air (i.e., the round-trip time for the light to travel from the device to the object and back to the device (duration of light beam 114, 116)). A method of measuring distance based on the time-of-flight of light (or the time-of-flight of any type of electromagnetic radiation) depends on the speed of light in air and is therefore distinguishable from methods of measuring distance based on triangulation or other methods.

In an embodiment, the housing 102 may include a display device 124, as shown in FIG. 1B. integrated into the 3D scanner 100. The display device 124 can include a user interface, which may be a graphical touch screen. For example, the display device 124 may have a user interface that allows the operator to provide measurement instructions to the 3D scanner 100, in particular to set the parameters or initiate the operation of the 3D scanner 100, and the display device 124 may also display measurement results.

In an embodiment, the scanning of a scanned environment by the 3D scanner 100 may take place by rotating the mirror 108 relatively quickly about the second axis 110 while rotating the housing 102 relatively slowly about the first axis 106, thereby emitting the light 114 in a spiral pattern. In a non-limiting example, the rotary mirror 108 may be driven to rotate at a speed of 5820 revolutions per minute. A scan is defined to be the entity of measuring points X in such a measuring. For such a scan, the center $C_{10}$ defines the origin of the local stationary reference system. The base 104 rests in this local stationary coordinate frame of reference.

Embodiments described herein are directed to image reconstruction for 3D scanning of environments, and more particularly to image data acquisition during a 3D scan of an environment. In the most general case, images are taken over a rotating mirror while the scanner rotates about the vertical axis and the scanner moves as a whole. In accordance with some embodiments of the present disclosure, image reconstructions is described associated with a known motion of a scanner as a whole as well as internal movements of the scanner and the times when the exposure of each individual camera pixel starts and ends. In accordance with embodiments described herein, such as embodiments having a stationary scanner with relatively slow rotation about the vertical axis, an exposure time of an imaging camera is synchronized with a rotation of a mirror such that the image information of an image contains the average of one whole mirror rotation (i.e., 360 degree rotation of the mirror). This may be achieved, for example, by selecting exposure times of the imaging camera that are an integer multiple of the duration of one mirror rotation. The color images or color captures are recorded continually during a laser scan and stored with a corresponding horizontal angle. The image data and reconstruction and application can be applied to 3D scanning data using methods similar to that used by Computed Tomography (CT) and knowledge about the geometry of the scanner housing.

Figure 2:
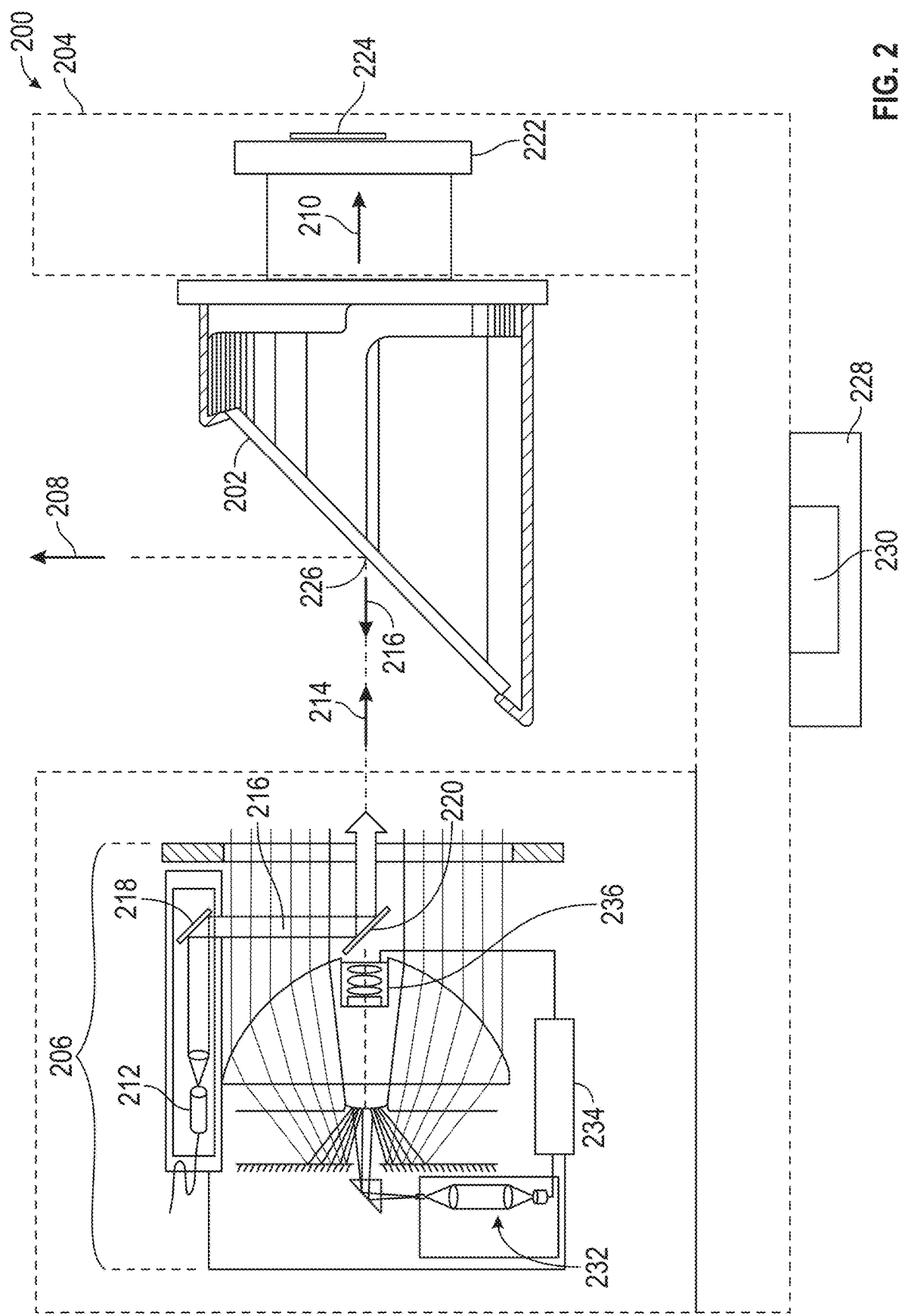
FIG. 2 is a schematic illustration of internal components of a 3D scanning system in accordance with an embodiment of the present disclosure.

Turning now to FIG. 2, a schematic illustration of a 3D scanner 200 in accordance with an embodiment of the present disclosure is shown. The 3D scanner 200 may be similar to that shown and described with respect to FIGS. 1A-1B and thus some features may not be discussed in detail again. In this illustrative embodiment, the 3D scanner 200 includes a rotary mirror 202 mounted within a housing 204. The 3D scanner 200 further includes a sensor assembly 206 arranged relative to the rotary mirror 202 such that light may be projected onto the rotary mirror 202 and light reflected thereon may be received at one or more light detectors of the sensor assembly 206. The housing 204 may be rotatable about a first axis 208 and the rotary mirror 202 may be rotatable about a second axis 210.

As shown, the sensor assembly 206 includes a light emitter 212. The light emitter 212 may be configured to emit and generate an emitted light beam 214 that is projected upon the rotary mirror 202, reflects off an object, and is subsequently reflected off of the rotary mirror 202 and back into the sensor assembly as a reflected light beam 216, as described above. In this embodiment, light 216 from the light emitter 212 reflects off a fixed mirror 218 and travels to dichroic beam-splitter 220 that reflects the light 216 from the light emitter 212 onto the rotary mirror 202. In this embodiment, the rotary mirror 202 is rotated by a motor 222 and the angular/rotational position of the rotary mirror 202 is measured by an angular encoder 224. Thus, the emitted light beam 214 may be reflected and direction about an environment in which the 3D scanner 200 is located. The 3D scanner 200 includes a gimbal point 226 that is a center of rotation about the first axis 208 and the second axis 210.

The housing 204 may be mounted to a base 228 configured to rotate the housing 204 about the first axis 208. The base 228 may include a respective angular encoder 230 configured to measure a rotation of the base 228 about the first axis 208. The combination of the rotation about the first axis 208 and the second axis 208, and projection of light and receipt thereof, enables scanning of an environment.

The sensor assembly 206 includes a light receiver 232. Coupled to the light emitter 212 and the light receiver 232 is a controller 234, as described above. The controller 234 is configured to determine, for a multitude of measuring points in an environment, a corresponding number of distances between the 3D scanner 200 and the points in the environment. The controller 234 is further configured to obtain or accept data from encoders 224, 230, light receiver 232, light source 212, and any additional components (e.g., auxiliary/imaging camera) and is given certain instructions for the purpose of generating a 3D point cloud of a scanned environment.

As shown, the 3D scanner 200 further includes an image acquisition device 236 (e.g., a central imaging camera) located internally to the housing 204 and may have the same optical axis as the 3D scanner device (e.g., second axis 210). In this embodiment, the image acquisition device 236 is integrated into the housing 204 (e.g., measuring head) and arranged to acquire images along the same optical pathway as an emitted light beam 214 and reflected light beam 216. In this configuration, the dichroic beam-splitter 220 allows light to pass through at wavelengths different than the wavelength of light 216 that is emitted from the light emitter 212. For example, the light emitter 212 may be a near infrared laser light (for example, light at wavelengths of 780 nm or 1150 nm), with the dichroic beam-splitter 220 configured to reflect the infrared laser light while allowing visible light (e.g., wavelengths of 400 to 700 nm) to transmit therethrough. In other embodiments, the determination of whether the light passes through the beam-splitter 220 or is reflected depends on the polarization of the light. The image acquisition device 236 can be configured to obtain 2D images of the scanned area to capture image data to add to the scanned image. In the case of a built-in imaging camera having an optical axis coincident with that of the 3D scanning device, the direction of the camera view may be easily obtained by simply adjusting the steering mechanisms of the scanner—for example, by adjusting the azimuth angle about the first axis 208 and by steering the rotary mirror 202 about the second axis 210.

Figure 3:
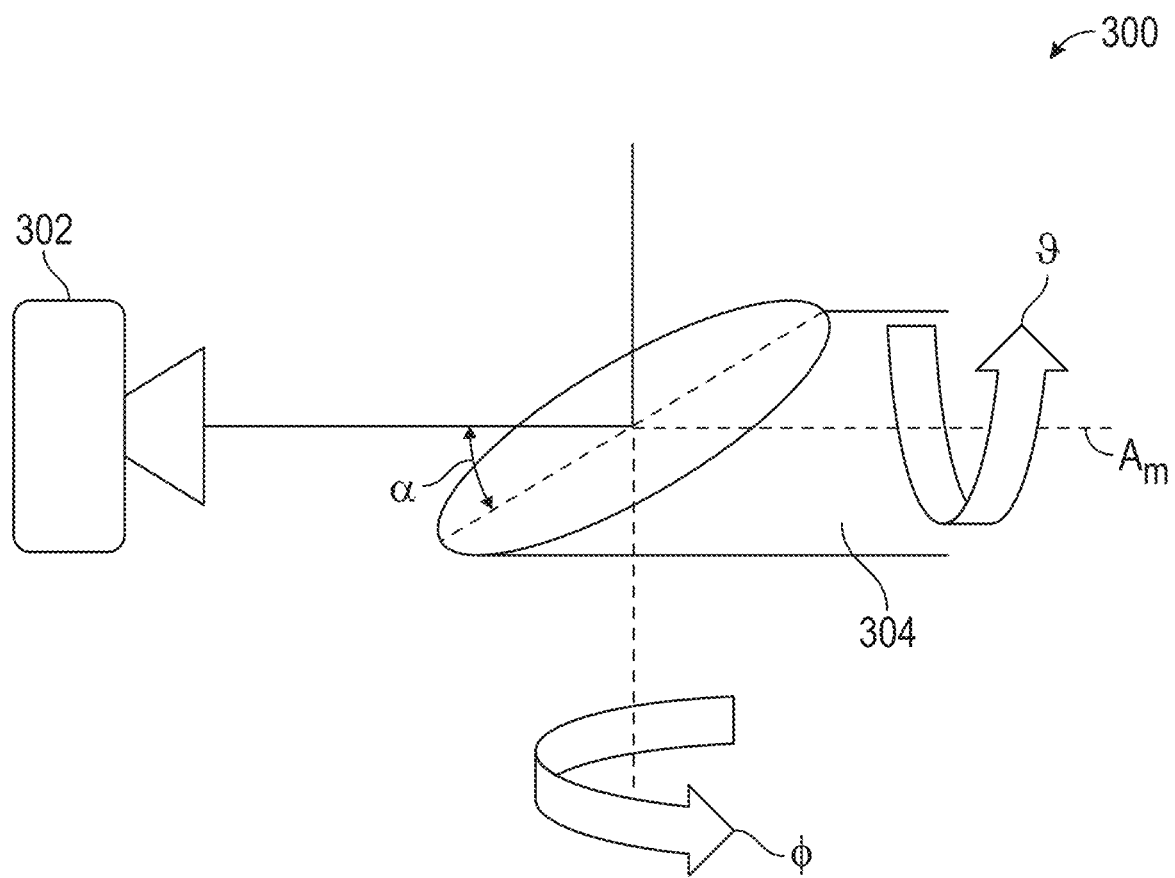
FIG. 3 is a schematic illustration of components and orientation thereof of a 3D scanner in accordance with an embodiment of the present disclosure.

Turning now to FIG. 3, a schematic partial illustration of a 3D scanner 300 in accordance with an embodiment of the present disclosure is shown. The 3D scanner 300 is schematically shown, with a sensor assembly 302 and a rotary mirror 304. The sensor assembly 302 and the rotary mirror 304 may be mounted within a housing or frame, as described above. The sensor assembly 302 is arranged and mounted relative to the rotary mirror 304, with the rotary mirror 304 being rotatable about a mirror axis $A_m$ (second axis described above). The rotation of the rotary mirror 304 may be performed using an operably connected motor or other driving device, as will be appreciated by those of skill in the art. The sensor assembly 302 is generally configured to both project light (e.g., a laser) and detect a return or reflection of the light, to thus capture data, as described above. The sensor assembly 302 may include both laser light for time-of-flight measurements as well as have a color or visible spectrum sensor configured to detect visible light that is reflected on the rotary mirror 304 and into the sensor assembly 302.

The rotary mirror 304 may be rotated about a mirror axis $A_m$ and be arranged at a mirror angle $\vartheta$ and the housing in which the sensor assembly 302 and the rotary mirror 304 are mounted may be rotated about a housing axis at a housing angle $\phi$ (e.g., about the first axis described above). The rotary mirror 304 is angled relative to the mirror axis $A_m$ and light incident upon the mirror along the mirror axis $A_m$ from the sensor assembly 302 is at an incident angle $\alpha$. Typically the incident angle $\alpha$ is set to 45° or about 45°. However, any incident angle between 0° and 90° (excluding such normal and parallel angles due to in operability) may be employed in accordance with embodiments of the present disclosure.

Figure 4:
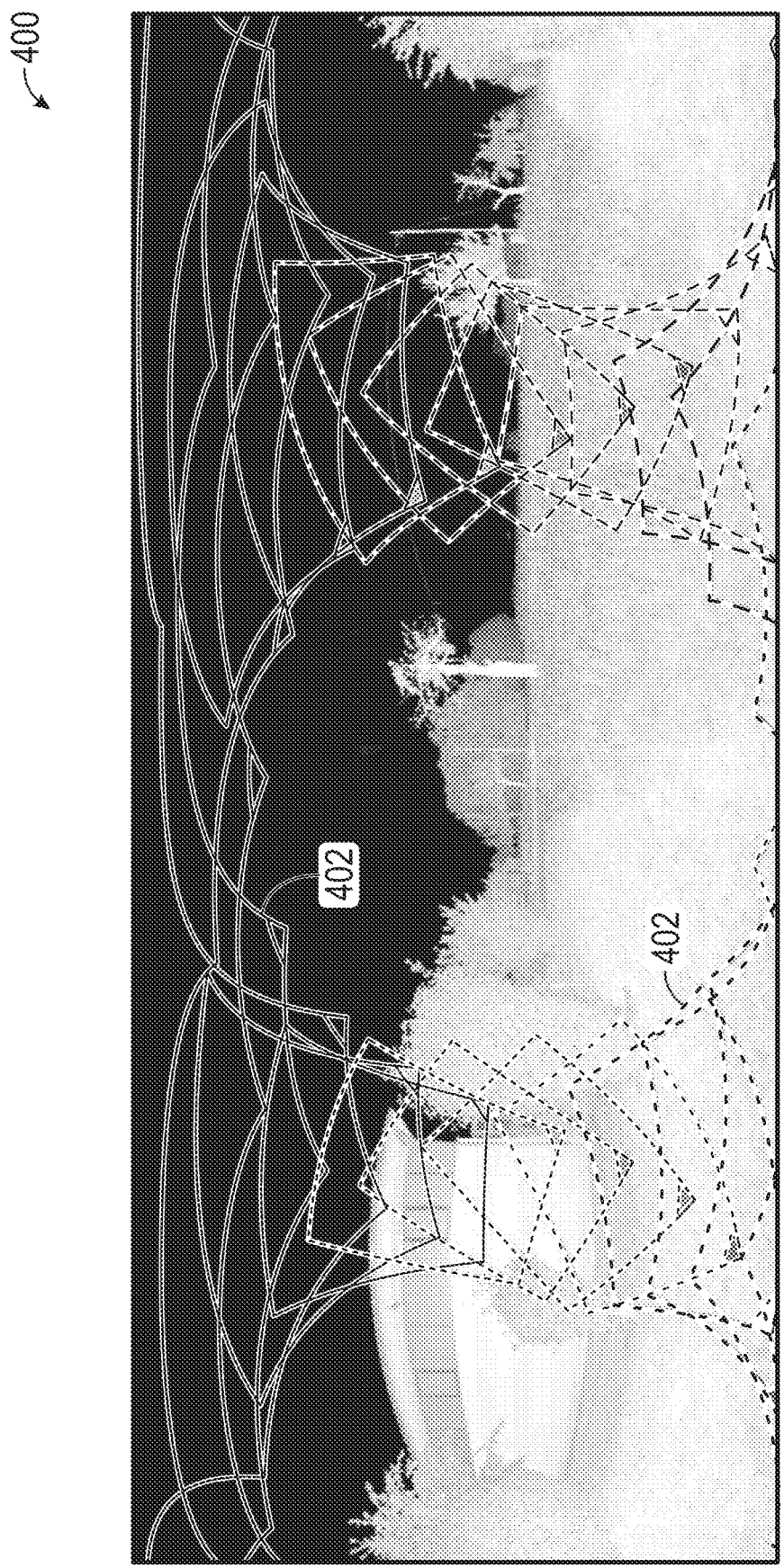
FIG. 4 is a schematic illustration of an equirectangular map projection of a laser scan of an environment in accordance with an embodiment of the present disclosure.

Turning now to FIG. 4, a schematic illustration of an equirectangular map projection 400 of a laser scan of an environment is shown. In this illustration, rectangular shapes 402 visualize the projection of the camera sensor onto the laser scan for different mirror angles $\vartheta$ (e.g., as shown in FIG. 3). The rectangular shapes 402 change with increasing mirror angle $\vartheta$. In this visualization projection 400, the coordinate system is made with respect to the housing or base within the environment. This is common visualization technique, and although may be used for color image reconstruction, it may be more convenient to switch to a map projection with the mirror angle $\vartheta$ as horizontal axis.

Figure 5:
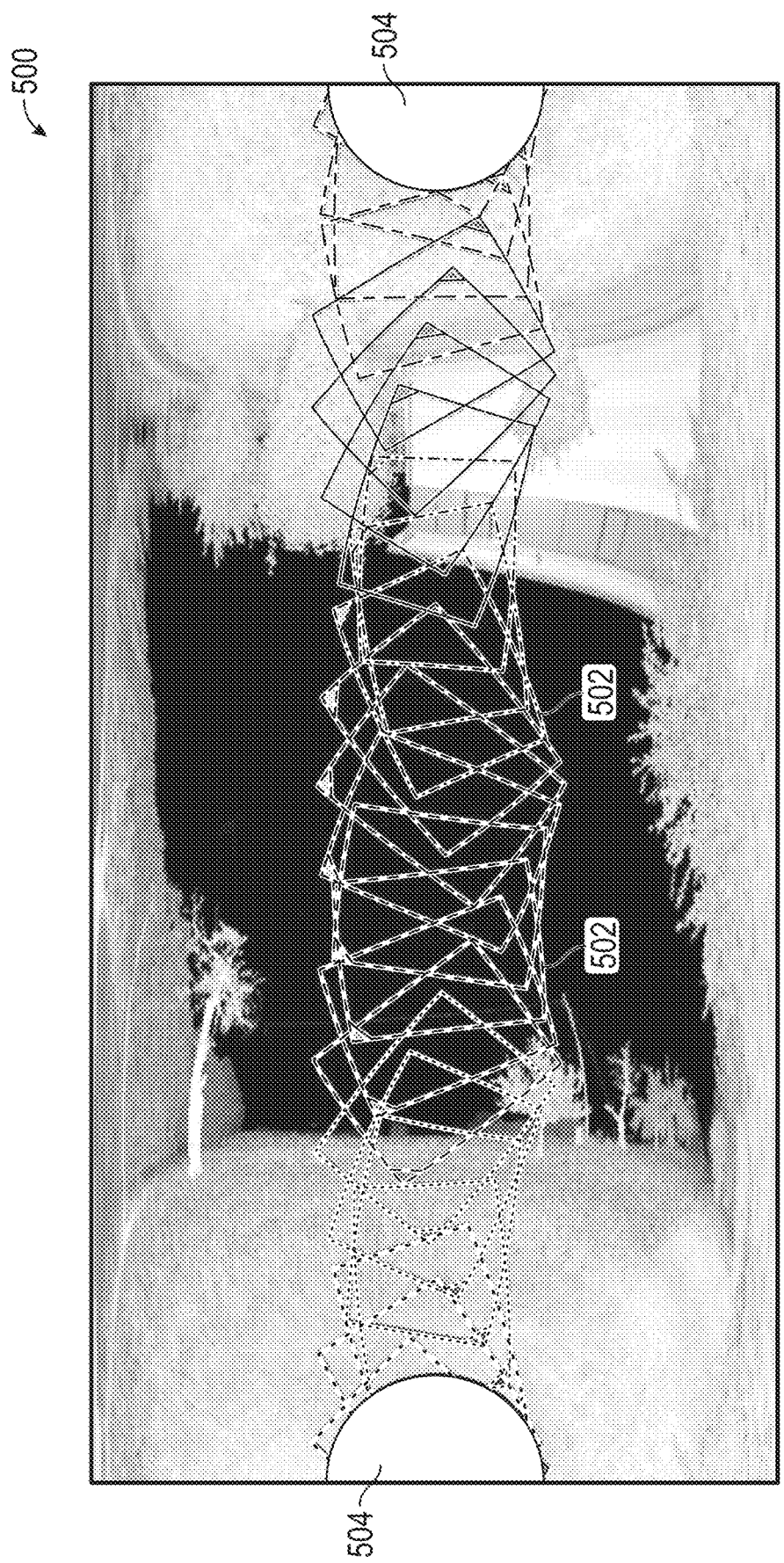
FIG. 5 is an alternative visualization technique of a map projection of a laser scan of an environment in accordance with an embodiment of the present disclosure.

For example, turning now to FIG. 5, an alternative visualization technique is shown. In FIG. 5, an equirectangular map projection 500 with less distortions in the region of interest is shown. In this illustration, rectangular shapes 502 visualize the projection of the camera sensor onto the laser scan for different mirror angles $\vartheta$ (e.g., as shown in FIG. 3). However, in FIG. 5, the equirectangular map projection 500 is made with respect to a mirror rotation coordinate system. In the natural coordinate system for mirror rotations, the projection of the camera sensor onto the laser scan is approximately described by a translation plus 360° rotation, with increasing mirror angle $\vartheta$. The camera sensor captures an average image along the illustrated path shown in FIG. 5. If the exposure time equals the time for a full mirror rotation, the captured image contains an average image along the full path described by the rectangular shapes 502 (e.g., snapshots), otherwise the resulting image contains a partial average. In FIG. 5, the semicircles 504 (left and right on the equirectangular map projection 500) mark a shadowed area below (i.e., between the mirror and the ground) the rotating mirror that is blocked by the structure of the laser scanner. This illustrative schematic was calculated for a calibrated scanner, i.e. it takes mechanical misalignments, camera distortions, and distortions through the map projection into account.

Figure 6A:
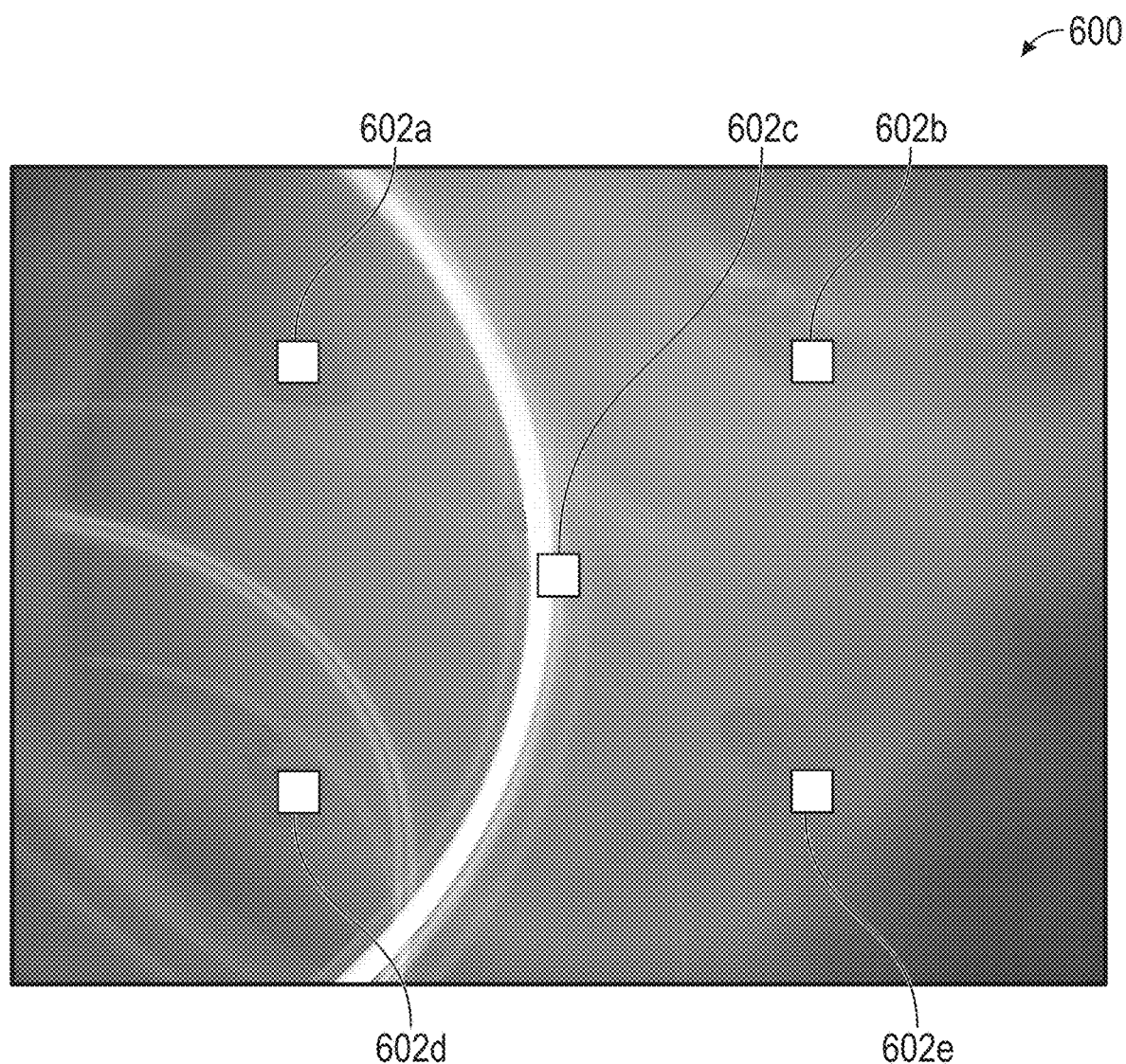
FIG. 6A shows an image taken during a fast mirror rotation, where some pixels are highlighted, in accordance with an embodiment of the present disclosure.
Figure 6B:
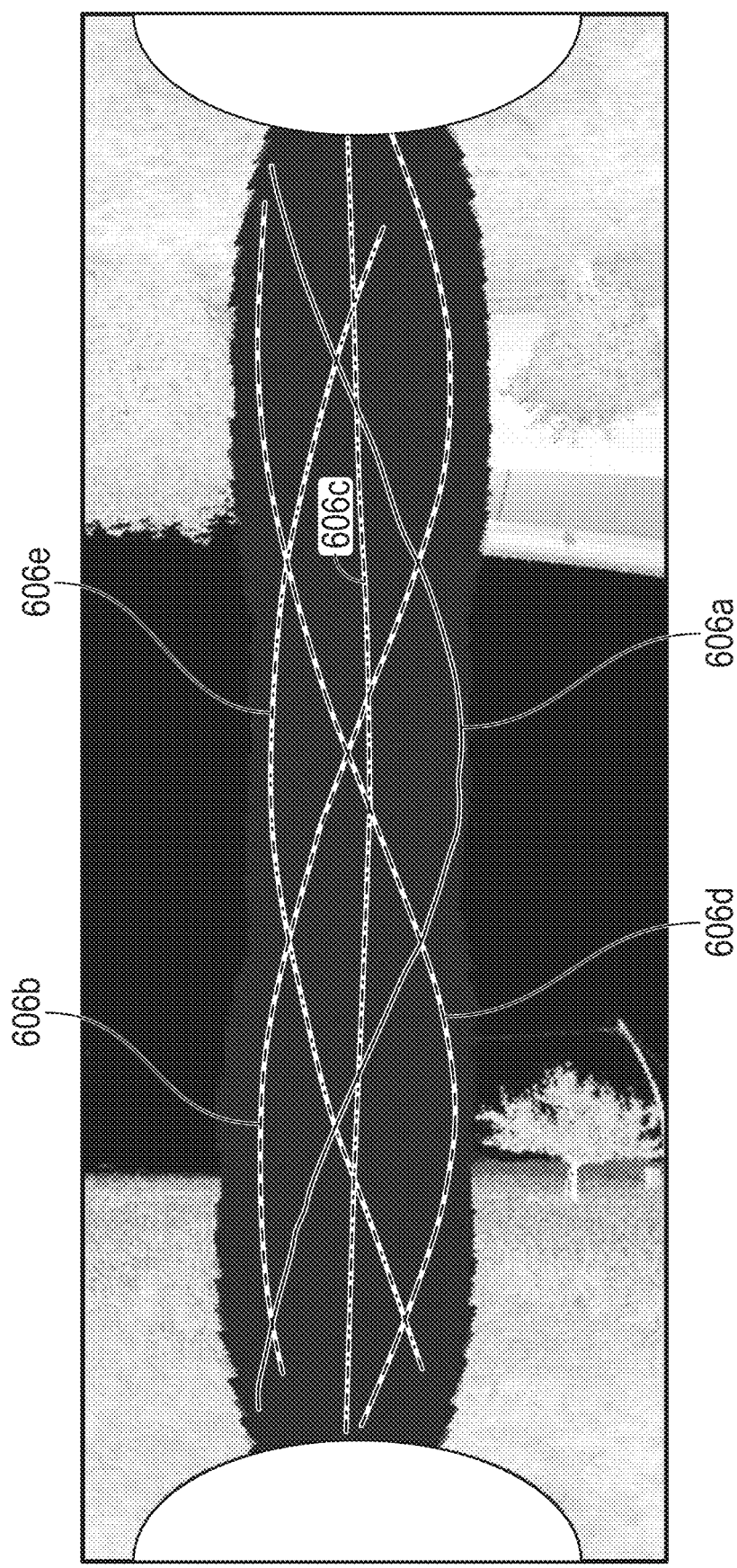
FIG. 6B is a schematic illustration of trajectories of pixels over a map projection in accordance with an embodiment of the present disclosure.

FIG. 6A shows image taken during a fast mirror rotation with a long exposure time, so that an image content 600 corresponds to an averaged image across all image positions 502 in FIG. 5 (including intermediate positions). Each pixel on the resulting image 600 accumulates the light along an individual trajectory. In FIG. 6A, five pixels 602a-e are highlighted to illustrate trajectories. The trajectories of the five pixels 602a-e are shown in FIG. 6B, which illustrates a map projection 604 with respective pixel trajectories 606a-e. That is, the pixels 602a-e are pixels on a final image and the pixel trajectories 606a-e correspond thereto during a scan. In the most general case, the trajectory of each individual pixel has a start and end point on the map projection 604 that corresponds to the opening and closing shutter event for the given pixel. If the exposure time equals the time for a full mirror rotation, the trajectories become closed curves.

The brightness and/or color of a given pixel 602a-e is determined by the accumulated light along its respective pixel trajectory 606a-e. Capturing the scene through a rotating mirror means that the pixel trajectories 606a-e are winded/curved and thus crossing, as shown in FIG. 6B. The resulting image can be interpreted in the same way as the sensor data recorded by a computed tomography (CT)

device—i.e., similar reconstruction and/or aggregation of data as employed in computer tomography is possible. That is, each pixel 602a-e records the accumulated light intensity along a respective pixel trajectory 606a-e within the map projection 604 (e.g., panorama) that needs to be reconstructed. A key aspect of this process is recognized in that the pixel trajectories 606a-e cross during the image capture. That is, at least two pixels of the pixels 602a-e will capture light from a single point in the map projection 604, at one or more intersection points, illustrated where the pixel trajectories 606a-e cross or intersect, as shown in FIG. 6B.

Figure 7:
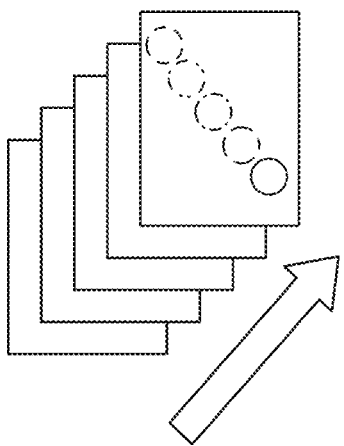
FIG. 7 is a schematic illustration of different two dimensional data collection processes.
Figure 7:
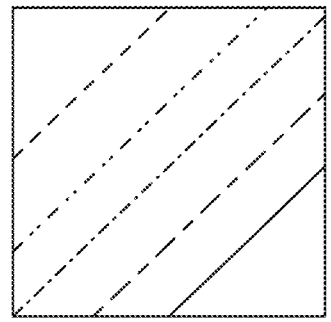
Figure 7:
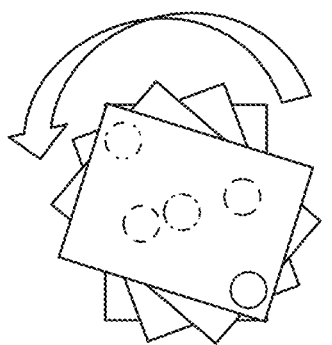
Figure 7:
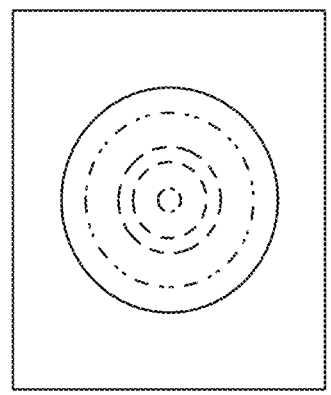
Figure 7:
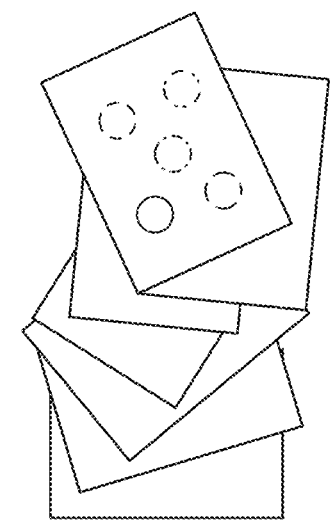
Figure 7:
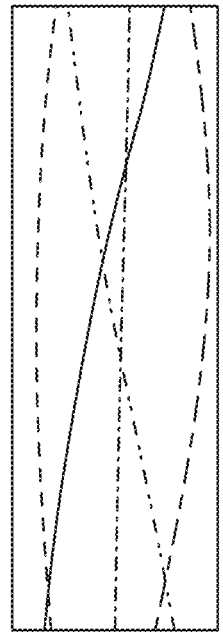

FIG. 7 illustrates three different basic movements of a camera chip (e.g., complementary metal-oxide-semiconductor (CMOS), charge-coupled device (CCD), or other image capture sensor) within a map projection. The depiction on the left in FIG. 7 describes a translation of a camera chip over a map projection. Such a case could be realized, for example, by a camera mounted to a scanner housing and oriented horizontally (e.g., as shown in FIG. 1A) and if the camera exposes a picture during a full rotation around the vertical axis (e.g., first axis 106 in FIG. 1A). In this case, the pixel trajectories are parallel lines and the content of the captured picture is effectively one dimensional. In such a case, the blurred pictures cannot be reconstructed because information is lost. The middle depiction in FIG. 7 describes a rotation of a camera chip over a map projection. Such a case could be realized, for example, by rotating a camera by 360° around an optical axis during the exposure of a picture. In this case, the pixel trajectories are concentric circles and the content of the captured picture is effectively also one dimensional. Here also, the blurred picture cannot be reconstructed due to missing information. The depiction on the right in FIG. 7 describes a combined rotation and translation of a camera chip over a map projection. Such a case is approximately realized for a camera (e.g., image acquisition device 236 shown in FIG. 2) that captures a picture through a rotating mirror. In this case, the pixel trajectories cross and the blurred picture can be reconstructed because the information is preserved. It is noted that the disclosed reconstruction technique described herein, and in accordance with embodiments of the present disclosure, does not depend on the movement of the camera chip being an exact combined rotation and translation.

In accordance with embodiments described herein, methods and processes for reconstructing image data of a scanned environment are provided. The image reconstruction (e.g., color) is based on the fact that pictures recorded by a camera (e.g., image acquisition device 236 shown in FIG. 2) that are captured by a rotating mirror while the scanner is rotating also around the vertical axis can be interpreted in the following way: each image pixel can be assigned to a trajectory in the scanned environment. The light intensity at each pixel is exactly the summed-up light intensity along its trajectory. Because the trajectories of the image pixels cross for camera configurations as described, a very large number of trajectories intersect at every three dimensional point. In such a case, algebraic image reconstruction methods (e.g., those known from the field of computed tomography) can be used to reconstruct the image information (e.g., color information) on the captured point cloud data.

Figure 8A:
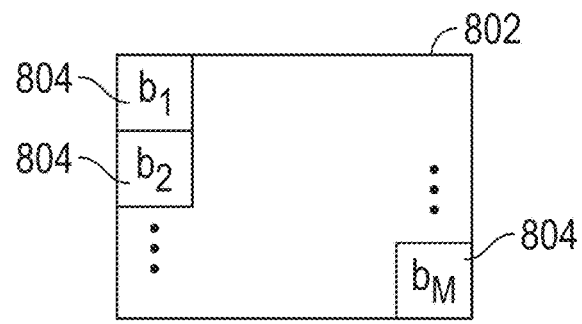
FIG. 8A shows schematically how a starting image for a reconstruction is discretized, in accordance with an embodiment of the present disclosure.
Figure 8B:
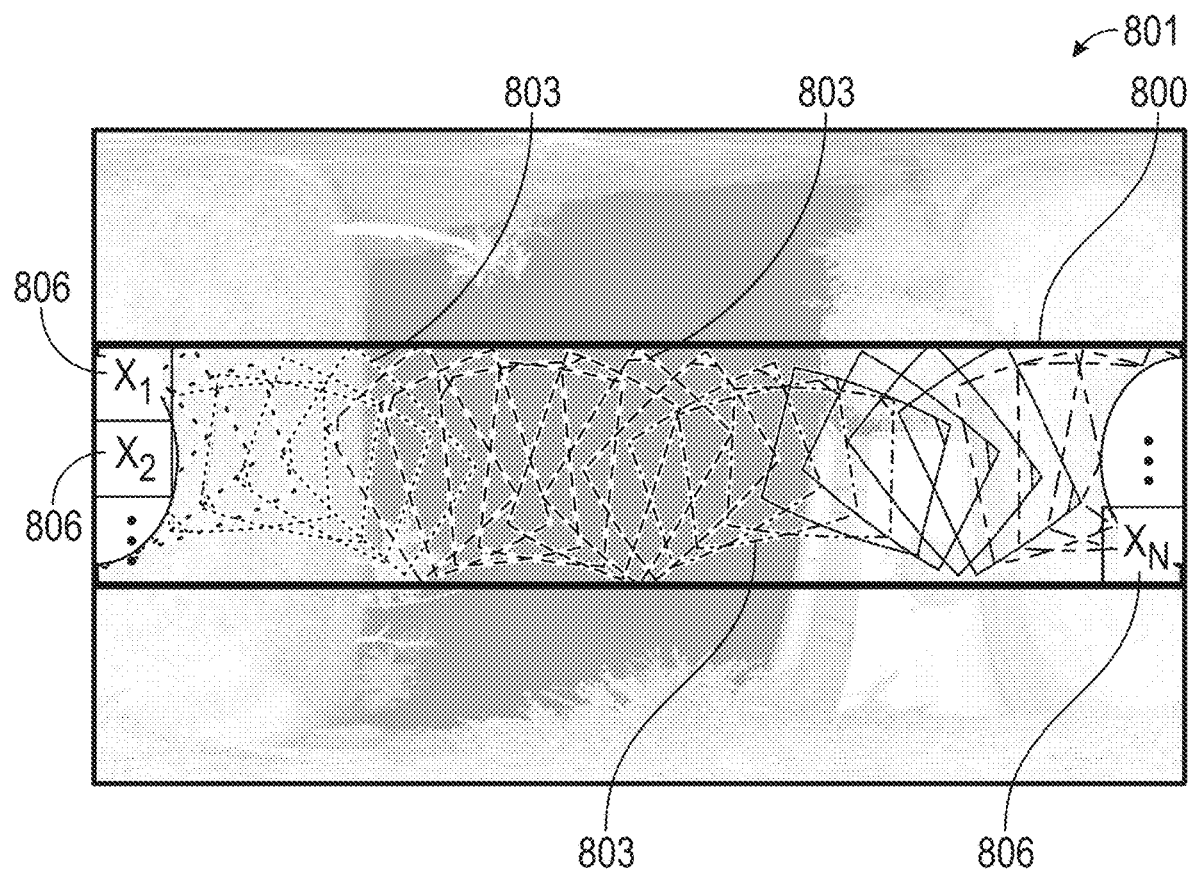
FIG. 8B shows schematically a discretization of a reconstructable image detail with the stating image shown in FIG. 8A.

Turning now to FIGS. 8A-8B, a map projection slice 800 of a recorded scene 801 is shown, with the recorded scene 801 illustratively shown in the background, and a resulting picture 802 is shown in FIG. 8A. A series of rectangular shapes 803 visualize the projection of a camera sensor onto a laser scan for some selected mirror angles ϑ over the map projection slice 800. The rectangular shapes 803 may change with increasing angle ϑ. If the mirror rotation is synchronized with the exposure time of the camera such that a 360° rotation is performed during the exposure, and if the movement around the vertical axis is negligible during a mirror rotation, the camera captures an average picture along the schematically illustrated path by the rectangular shapes 803. The resulting picture 802 is schematically shown in FIG. 8A together with a discretization into individual pixels 804. The pixels 804 may be denoted by $b_1, b_2, \ldots b_M$, and rearranged into the vector $\vec{b}$ with M being the total number of pixels 804 which is given by the camera resolution. The value of these image pixels represent known data and may consist of either a single value (e.g., for a black and white image sensor/camera) or, for example, of three values corresponding to red, green, and blue sub-pixels (e.g., in the case of a color sensor/color camera). A reconstruction is obtained for the map projection slice 800 which is defined by the illustrative bounding box of all camera sensor projections for any mirror angle. It is convenient to discretize this map projection slice 800 into single pixels 806. The pixels 806 of the map projection slice 800 are arranged into a vector $\vec{x}$ with the elements $x_1, x_2, \ldots, x_N$, with a total number of N pixels 806. Also in this case the pixels 806 of the map projection slice 800 may have, for example, one component (for a black and white camera) or three components (for a color camera). The vector $\vec{x}$ denotes the unknown values. In order to get a reasonable reconstruction result, the number of pixels N needs to be smaller than the number of pixels M (N<M). Note that each pixel 806 of the map projection slice 800 can be mapped onto point cloud data collected by a time-of-flight or other type of three-dimensional scanner (e.g., as described above).

The reconstruction of the image information of a scene recorded by a camera through a rotating mirror may be simplified if the exposure time of the camera is synchronized with the mirror rotation such that the image information of an image contains the average over one whole mirror rotation. This can be realized, for example, by selecting exposure times that are an integer multiple of the duration of one mirror rotation, or by creating an average picture from an integer number of pictures that are taken seamlessly during one mirror rotation. In accordance with some embodiments, during the laser scan, such images may be recorded continually and stored together with a corresponding pan axis orientation.

Finally, the image information can be reconstructed by using methods from, for example, Computed Tomography (CT) together with the knowledge about the scanner housing. This is possible because each pixel in the recorded images corresponds to an average on a trajectory/path through the scene and because these trajectories/paths cross—as shown and discussed above. Recording the images through a rotating mirror ensures that the trajectories from different pixels within the same image are always crossing. Further, in some embodiments, the trajectories belonging to pixels from images with neighboring pan axis position may also cross, which can improve reconstruction results. Crossing trajectories are the basic requirements for using reconstruction methods as described herein.

The vectors $\vec{b}$ and $\vec{x}$ are related by a linear equation, $\overleftrightarrow{A}\vec{x}=\vec{b}$, or:

$$\Sigma_{j=1}^{N} a_{ij} x_j = b_i, \text{ for } i=1, \ldots, M \text{ with } M>N \quad (1)$$

with the normalization $$\Sigma_{j=1}^{N} a_{ij} = 1 \quad (2)$$

In equation (1), the weights $a_{ij}$ denote the fraction of the exposure time that contribute to the pixel $b_i$ and originates from the area $x_j$. The knowledge about the camera position and orientation, the exact position of each scanner axis at each moment during the exposure, and the knowledge about when the exposure starts and ends for each single pixel determine the weights $a_{ij}$ completely. The weights $a_{ij}$ can be written as:

$$a_{ij} = \begin{cases} a_{ij} & \text{if } \exists\, \vartheta \in [0; 2\pi] \text{ with } P_{\varphi\vartheta}(i) = j \\ 0 & \text{otherwise} \end{cases} \quad (3)$$

In equation (3), $P_{\varphi\vartheta}$ is the known projection that maps a position index from the recorded images ($\vec{b}$) onto a position index of the color scene to be reconstructed ($\vec{x}$) for a given horizontal angle $\varphi$ and mirror angle $\vartheta$, with:

$$P_{\varphi\vartheta}: \{1, \ldots, M\} \rightarrow \{1, \ldots, N\} \quad (4)$$

In a more general approach, where the scanner is moving as a whole, the projection $P_{\varphi\vartheta}$ depends also on the position and orientation of the scanner as a whole. In a simplified reconstruction approach, the weights $a_{ij}$ can be approximated by a constant that is determined by the normalization condition given in equation (2). It is noted that the projection $P_{\varphi\vartheta}$ contains all of the relevant details about the scanner geometry and the camera mapping (including distortions, scanner specific calibrations, etc.) and includes knowledge about the used coordinate systems and the used discretization.

Many different approaches are known to solve the system of linear equations, e.g., as given by equation (1), for $\vec{x}$. Some such approaches are known from the field of computed tomography. For example, reconstructions in the Fourier domain, back projection algorithms, iterative reconstruction algorithms, algebraic reconstructions, and/or reconstructions based on the Radon transformation, are some such examples. In the following, the Kaczmarz method is described to obtain a solution of equation (1). This method provides an iterative solution to obtain a good approximation for $$\vec{x}^{k+1} = \vec{x}^k + \frac{b_i - \langle \vec{a_i}, \vec{x}^k \rangle}{\|\vec{a_i}\|^2} \vec{a_i}^T \quad (5)$$

In equation (5), $i = (k \bmod M) + 1$, $\vec{a_i}$ is the i-th row of the matrix $\overleftrightarrow{A}$, and $\vec{x}^0$ is any initial value. This is merely one example solution and other mathematical solution (e.g., from the field of computer tomography) may be employed without departing from the scope of the present disclosure.

Figure 9A:
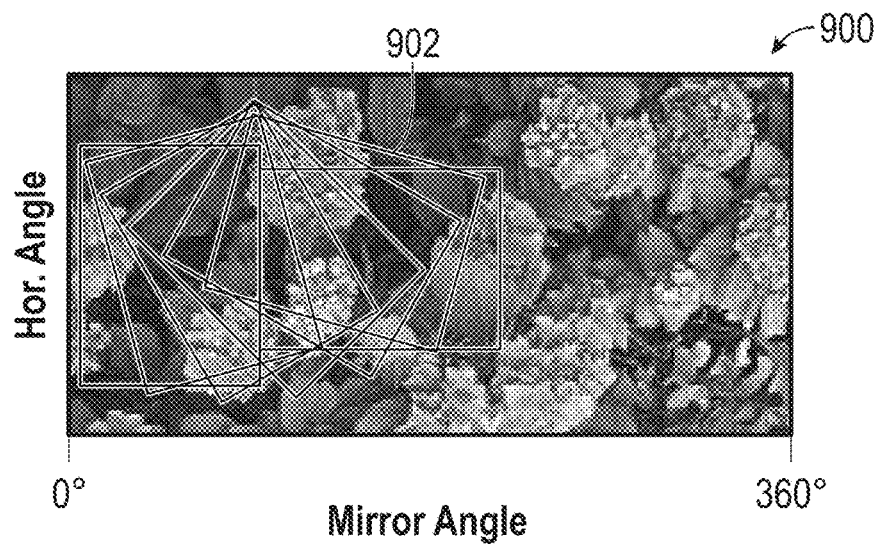
FIG. 9A is a starting image for a reconstruction simulation in accordance with an embodiment of the present disclosure.
Figure 9B:
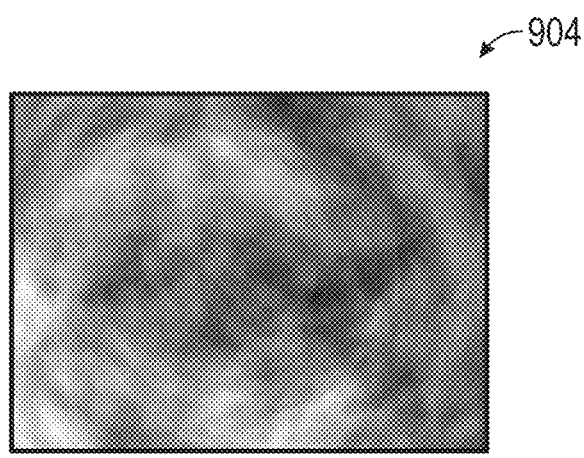
FIG. 9B is a simulated picture as obtained from a camera movement as schematically indicated in FIG. 9A.
Figure 9C:
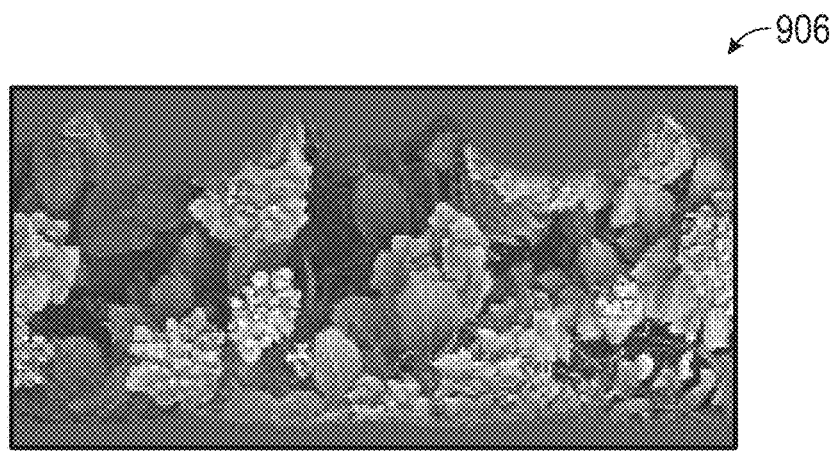
FIG. 9C is a color image reconstruction from FIG. 9B in accordance with an embodiment of the present disclosure.

FIGS. 9A-9C provide an example simulation in accordance with an embodiment of the present disclosure. FIG. 9A is an arbitrary image that represents the environment which is captured by a rotating mirror, FIG. 9B represents an image obtained from a full mirror rotation at a fixed housing angle, and FIG. 9C represents a reconstruction thereof.

In FIG. 9A, a map projection slice 900 is scanned/captured by rotating a mirror without moving a vertical axis thereof. The rectangles 902, overlaid on the map projection slice 900, are representative of the mirror rotation. For the sake of simplicity, the movement of the projected camera sensor onto the displayed scene is assumed to be a full 360° rotation combined with a horizontal translation. The image 904 shown in FIG. 9B is generated from the capture of FIG. 9A by averaging over all sensor positions indicated by the rectangles 902 in FIG. 9A and intermediate positions over a full mirror rotation from 0° to 360°. As such, FIG. 9B represents a picture or image that would have been captured from during the scan of map projection slice 900 with a shutter being open during a full mirror rotation. It is noted that this simulation describes an idealized process, where distortions due to camera optics, mechanical misalignments, distortions from the map projection, etc. are ignored. However, it is noted that these distortions are typically very small and can be taken into account. That being said, such distortions do not impact the concepts captured by the present disclosure. FIG. 9C represents a reconstruction 906 of the scanned environment 900, using the Kaczmarz method described above. The irregular shape of the reconstruction 906 reflects the envelope from the translation and 360° rotation.

In accordance with some embodiments of the present disclosure, reconstruction of all three typical color channels (e.g., red, green, blue) is a straight forward generalization. Each color channel can be reconstructed independently, and combined to reconstruct a full color scan of an environment.

Figure 10:
FIG. 10 is a schematic illustration of a full panorama reconstruction where multiple pictures are recorded at different positions of along a vertical axis in accordance with an embodiment of the present disclosure.
Figure 10:
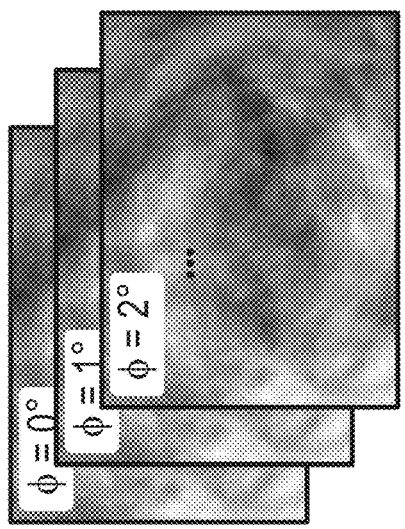

For a full panorama reconstruction, a laser scanner may rotate slowly about a vertical axis, as described above, while a mirror is rapidly rotated for full image data capture (both time-of-flight and color). To reconstruct the full panorama, the above described procedure may be repeated for different horizontal angles $\phi$. This is illustratively shown in FIG. 10. As shown, a series of images for different horizontal angles $\phi$ ($\phi=0°$, $\phi=1°$, $\phi=2°$, . . . ) is recorded. Each image contains image information for overlapping slices of the full panorama. In accordance with some embodiments of the present disclosure, instead of reconstructing each slice independently and stitching a result, it is possible to reconstruct the full panorama in one step by a straight forward generalization of the discretization.

Figure 11A:
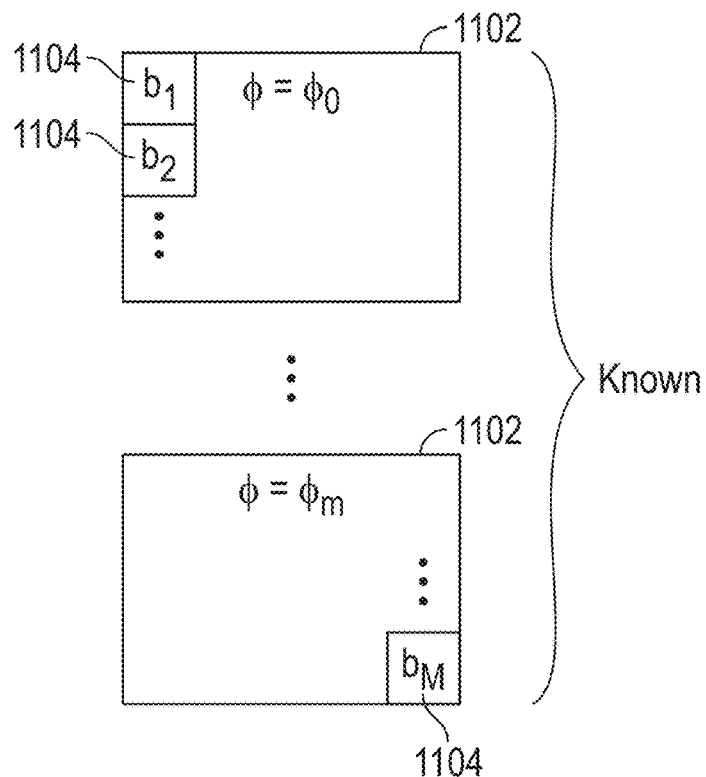
FIG. 11A is a schematic illustration of a discretization procedure for a set of images that are part of the most general reconstruction process in accordance with an embodiment of the present disclosure.
Figure 11B:
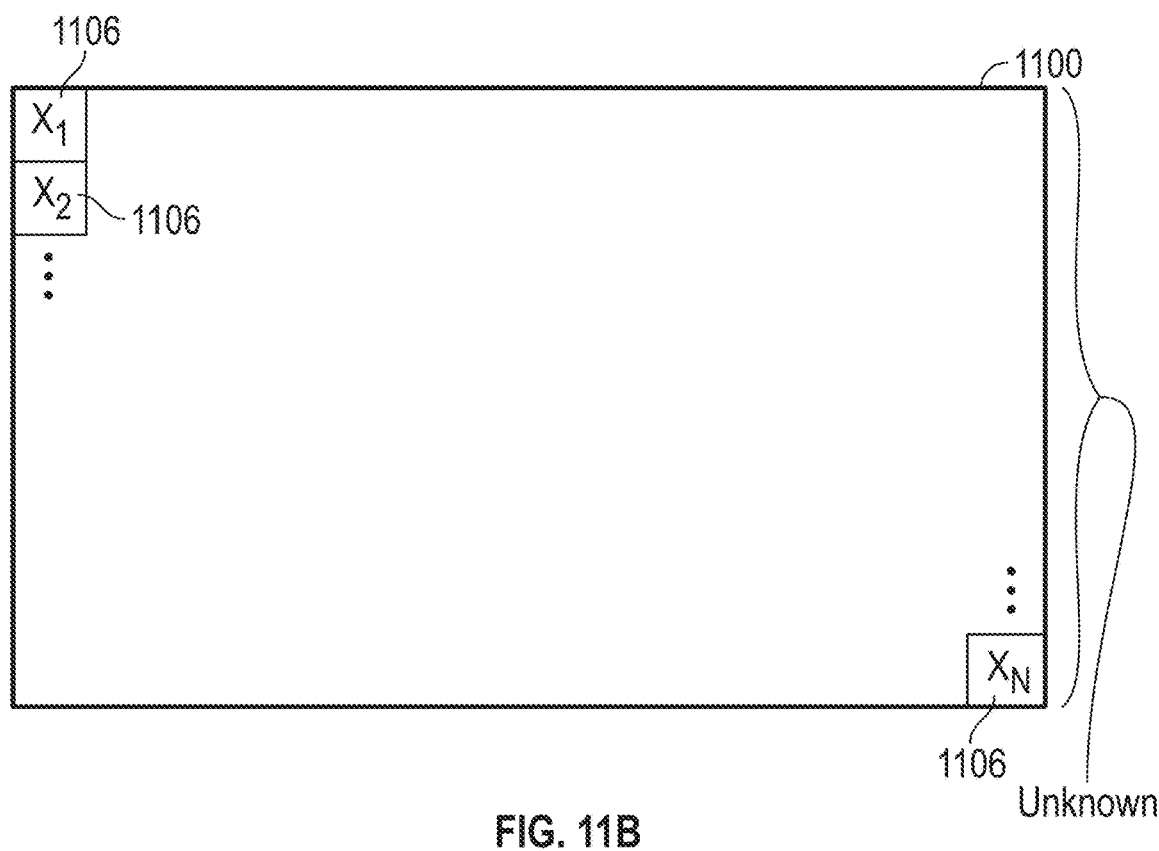
FIG. 11B shows schematically the discretization of the reconstructable image detail with the starting images shown in FIG. 11A.

FIGS. 11A-11B illustrate a discretization for the reconstruction of a full panorama substantially similar to that shown and described with respect to FIGS. 8A-8B. However, in contrast to FIG. 8B, a reconstruction area 1100 consists of the whole panorama scene and not only a small slice. The reconstruction area 1100 may be illustrative of a panoramic representation of a scene, but it could also be a mapping of image data onto a point cloud data set as recorded or captured by a laser device. A series of images 1102 are captured while the mirror and the vertical axis is rotated. Each image 1102 includes a plurality of image pixels 1104, as shown in FIG. 11A and illustratively shown as $b_1, b_2, \ldots, b_M$, with a total number of M pixels for all images 1102. The image pixels 1104 may be arranged into a vector $\vec{b}$. The image pixels 1104 define the series of images 1102 and represent known data over a series of horizontal angles $\phi_0$ to $\phi_m$. The horizontal angle is used to label the images 1102. However, the image reconstruction does not depend upon the label and works in the same way if the horizontal angle changes during the image acquisition.

The images 1102 are obtained using a rotating mirror and a rotating scanning devices. Even in the most general case, where the exposure time is not synchronized with the mirror rotation, and where the scanner itself may be moved along a known trajectory, each image pixel 1104 can be mapped onto a unique trajectory within the reconstruction area 1100. The starting point of this trajectory corresponds to the opening of the shutter for a given pixel and the end point of the trajectory corresponds to the closing of the shutter. The reconstruction area 1100 (e.g., full panorama or point cloud data), as shown, is comprised of a number of pixels 1106. The pixels 1106 are unknowns, and can be determined by rearranging such pixels 1106 into a vector $\vec{x}$. The pixels 1106 are illustratively shown as $x_1, x_2, \ldots, x_N$, with a total number of N pixels. The total number N of pixels 1106 has to be chosen to be less than the total number M of the image pixels 1104 (i.e., M>N). As such, the same equations and algorithms described above may be applied for a full panoramic scan and image reconstruction thereof.

It is noted that, as shown for example in FIGS. 1A-1B and FIG. 2, a portion of the housing or scanner may be captured by the camera during revolutions of the mirror. This may result from, for example, the field of view of the camera. However, the location of the captured housing within the image will depend on the mirror angle $\vartheta$. To remove the scanner housing that may be captured in a reconstruction, the reconstructed image may be clipped. It is noted that, in general, it is not possible to clip the source images because, due to blurring, portions of the housing may be smeared (or appear) over the whole picture. In some embodiments, instead of clipping the reconstructed images, the discretization of the color scene could also include the visible parts of the scanner housing. One may use the fact that the housing does not change for different horizontal angles—only the illumination thereof changes (smoothly). For iterative (algebraic) reconstruction methods, this information can be used to speed-up the reconstruction via good starting values.

As noted and discussed above, both time-of-flight (3-dimensional data) and image data is obtained during a single scanning operation with a single scanning unit. The image information obtained as described above may be mapped onto the recorded 3-dimensional data points from the time-of-flight (or other distance) measurements. This can be taken into account naturally in the discretization of the color scene by assigning each 3-dimensional point the image information $x_i$.

Figure 12:
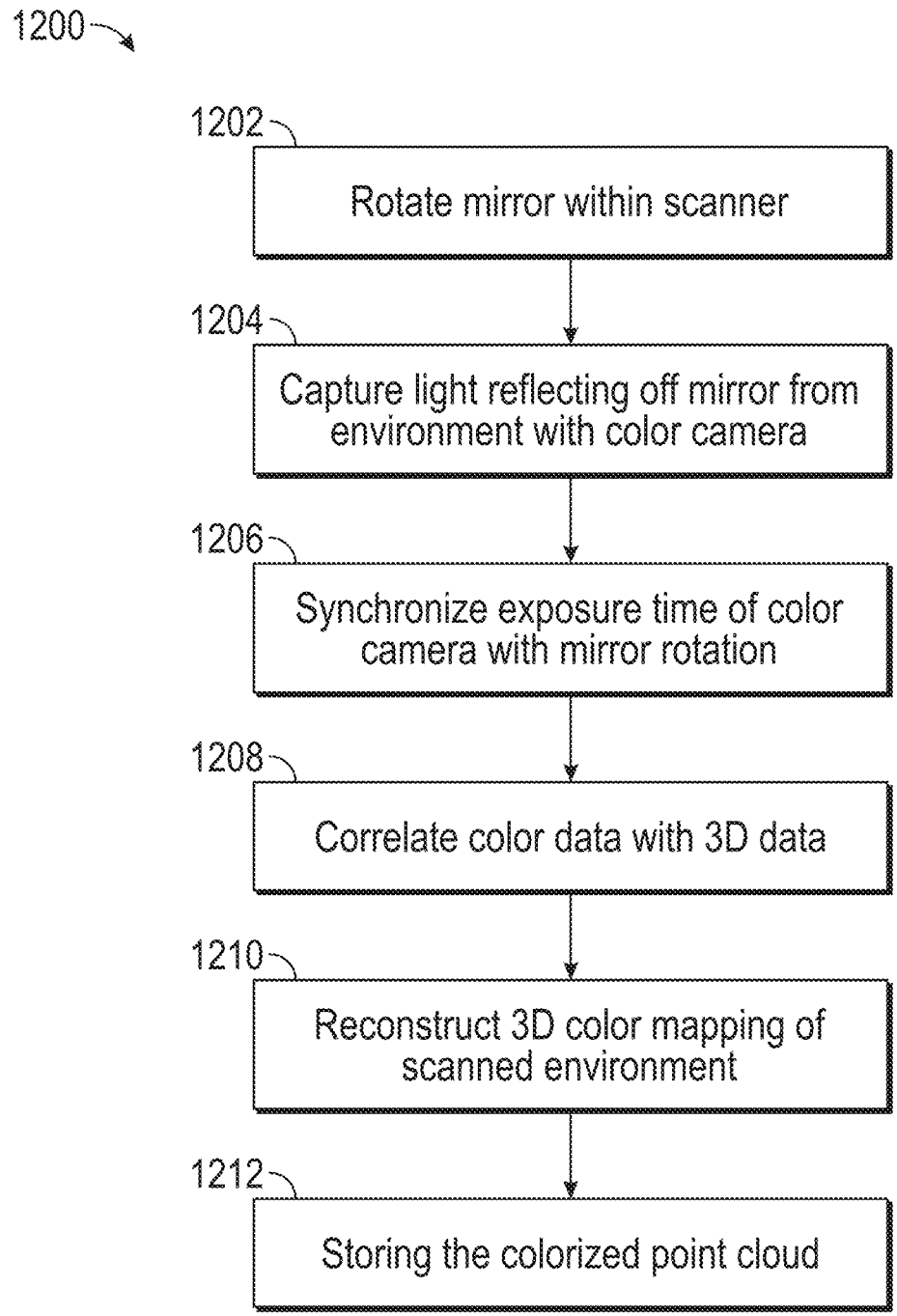
FIG. 12 is a flow process for capturing image data of an environment in accordance with an embodiment of the present disclosure.

Turning now to FIG. 12, a flow process 1200 for scanning an environment and capturing image information thereof. The flow process 1200 may be as described above, and may be carried out using a laser scanner having a rotatable mirror configured and disposed to receive light from the environment and to direct at least a portion of the received light onto an imaging camera of the laser scanner. That is, the laser scanner used for the flow process 1200 may be similar to that shown and described above. The mirror is configured to rotate relative to the imaging camera. The camera is configured to be stationary relative to a rotational axis of the mirror. The laser scanner is also configured to project light from a light source (e.g., a laser) to take time-of-flight or distance measurements to capture a 3-dimensional image (3D data) of the environment, with the projected light being projected onto and reflected on the mirror (and returned thereon as well).

At block 1202, the mirror is rotated relative to the imaging camera. The rotation of the mirror may be driven by a motor or similar device. In some embodiments, the driving of the rotation of the mirror will cause the mirror to rotate at least 360°. It will be appreciated that such rotation may be part of a continually rotating mirror that is used for making a laser scan of an environment—i.e., multiple rotations. Such full circle rotation may allow for light to be reflected from the mirror in a full span/scan. At the same time, in some embodiments, a housing or scanner that include the mirror and the camera may be rotated about another axis (e.g., perpendicular to an axis of the rotation of the mirror). Such additional rotation enables a full scan of an environment. In some embodiments, and as discussed above, the rotation of the scanner/housing may be relatively slow in comparison to the relatively fast rotation of the mirror within the housing/scanner. Moreover, in some embodiments, the scanner as a whole is moving along a known trajectory. Further, in some embodiments, a light source may be arranged to project light (e.g., laser) toward the mirror to be reflected into the environment. The projected light will reflect off of objects or other aspects of the environment and be directed back to the mirror.

At block 1204, the imaging camera captures one or more image containing image information from light received from the environment—i.e., that reflects off the mirror and into/toward the imaging camera. In some embodiments, projected light (e.g., laser) may also be reflected off the mirror that is reflected from the environment. Accordingly, both image data and distance data (e.g., 3D data) may be collected simultaneously.

At block 1206, synchronizing an exposure time of the imaging camera with a defined duration of the mirror rotation such that image information of a captured image contains an average of the image information corresponding to the duration of the mirror rotation is performed. The synchronizing may be performed using a processor, microprocessor, field-programmable gate array, or other processing circuit as will be appreciated by those of skill in the art. In some embodiments, each image captured by the imaging camera may correspond to a single rotation of the mirror such that a full 360° span of color is collected by the imaging camera. In some embodiments, the defined duration may be greater than or less than a full rotation of the mirror. It is noted that such synchronization may be optional, and is not required in accordance with various embodiments of the present disclosure. Furthermore, the steps of block 1204 and block 1206 may be performed simultaneously (and in operation would typically be performed simultaneously).

In such data collection, each pixel of the image contains image information of an accumulation of the received light along a corresponding individual trajectory during the defined duration of the mirror rotation, as described above. Further, as discussed above, each individual trajectory has a trajectory that crosses another of the individual trajectory. This crossing of the trajectories enables the image reconstruction. In some embodiments, the trajectories may be measured or taken in a 2D coordinate system of the environment, in a coordinate system based on the scanner/housing, or based on some other coordinate system.

At block 1208, the synchronized image data may be correlated with 3D data. As noted above, the 3D data may be obtained simultaneously with the image data, using the same mirror, housing, and rotations of mirror and/or housing. In some embodiments, because the data is collected simultaneously, a 3D image reconstruction of a scanned environment may be generated. Further, in some embodiments, a simultaneous color or image reconstruction may be possible using other alternative approaches.

Accordingly, at block 1210, the correlated 3D data and image data are used to reconstruct a 3D color mapping of the scanned environment. In an embodiment, the reconstructed color mapping forms a colorized point cloud of the scanned environment.

This colorized point cloud may be stored in memory at block 1212 for later retrieval and display by a user. In an embodiment, the image reconstruction and color mapping is performed on the controller 120, 234. In other embodiments, the image reconstruction and color mapping may be performed during post processing on a separate computing device.

It will be appreciated that blocks 1208, 1210, and 1212 may be optional steps performed if/when three dimensional data is collected. It will be appreciated that such 3D data collection is not required in accordance with all embodiments of the present disclosure.

In the most general case, a color (or other) image may be collected over an arbitrary exposure time. However, the image reconstruction is particularly simple if the exposure time is synchronized with the mirror rotation. This may be only applicable if the vertical rotation can be ignored for the image reconstruction. The synchronization may be, for example, such that (a) the exposure time lasts as long as an integer number of mirror rotations or (b) that an integer number of pictures is captured seamlessly during one whole mirror rotation. The first scenario (a) may be applicable for relatively dark environments in combination with a fast mirror rotation, i.e., when long exposure times are required. The second scenario (b) may be applicable for bright situations in combination with a slow mirror rotation, i.e., when short exposure times are required. In the second scenario (b), the sequentially recorded images may be averaged to apply the reconstruction algorithm described herein.

By using the image (color) reconstruction methods described herein a color mapping to a 3D reconstructed scan of an environment may be achieved. In some embodiments, the results may be further improved if a mirror encoder position is known for the beginning of the exposure as well as for the end of the exposure, together with timing knowledge about, for example, a rolling shutter of the imaging camera. In some embodiments, a global shutter may be employed. However, if the exposure time is synchronized with the mirror rotation, as described above, such detailed knowledge may not be required for the image reconstructions, i.e., the reconstruction may be independent of the mirror position thus eliminating a need for a challenging synchronization between a mirror encoder value and the beginning of the exposure of the imaging camera. Furthermore, in configurations that include synchronization, rolling shutter effects may not need to be accounted for, because each camera line records an average over a whole mirror rotation, thus eliminating any need for a challenging synchronization with internal components of an imaging camera Technical effects and benefits of some embodiments include providing a laser scanning system that can acquire 3D coordinate data and image information simultaneously during a scanning operation to reduce the time to generate a colorized point cloud of an environment.

In accordance with embodiments of the present disclosure, image reconstruction techniques are described. The image reconstruction techniques may be applicable for one or more blurred pictures that are captured by a two-dimensional pixel array (i.e., an image capture sensor). The 2D pixel array may be rotated or otherwise moved to sweep either directly or indirectly, e.g., via optical elements such as a moving mirror, over a captured two- or three-dimensional scene. The 2D pixel array may be a color camera, a black-and-white camera, an infrared camera, or other camera or sensor that is configured to capture an image. That is, the camera is configured to receive light that originates from the scene to capture images, in contrast to a time-of-flight laser that projects and receives the same light at a source/receiver (as described above).

The reconstruction methods and processes described herein rely upon certain factors being present to enable the reconstruction of image data. The movement of the two-dimensional pixel array (or its virtual image in case of an optical imaging) with respect to the scene must be known during the exposure. In other words, the projection of an individual pixel from one captured image during an exposure onto the scene defines a trajectory, and the trajectories of each single pixel must be known. Furthermore, in addition to the trajectories being known, there must be crossing trajectories of different pixels from one or several image captures. By knowing the trajectories and the crossing or overlapping of data enables the reconstruction techniques described herein.

In accordance with some embodiments, an image reconstruction technique for a stationary laser scanner with rotating mirror and pan axis is provided. In such embodiments, pictures or images with a color camera are captured during a laser scan through a rotating mirror, similar to that shown and described above. In some embodiments, an image reconstruction technique for a laser scanner with a rotating mirror and pan axis is provided. In such embodiments, pictures or images using a color camera (or other image capture device) are captured during a laser scan through the rotating mirror and the scanner as whole is moved during the scan with knowledge about the trajectory of the scanner.

In accordance with some embodiments, image reconstruction techniques for stationary laser scanners having a rotating mirror and a slowly rotating pan axis are provided. In such embodiments, pictures or images may be captured using a color camera during the laser scan through the rotating mirror. Further, the exposure time of the pictures/images captured by the camera may be synchronized with the mirror rotation, such that the image reconstruction becomes independent of camera internal components (e.g., rolling shutter effect, etc.) and independent of the exact mirror positions for each moment of the exposure.

As discussed above, embodiments of the present disclosure are related to obtaining a reconstructed image while also obtaining 3D information (e.g., laser scan) regarding an environment. In such embodiments, the imaging may be mapped to or otherwise correlated with the 3D data, such as aligning image data with a three dimensional point cloud data set. However, such image reconstruction is not explicitly or necessarily tied to or requires such distance information/data. That is, the 2D panorama image reconstruction techniques described herein may be used without distance or 3D data collection. The image reconstruction may be used with a system that includes an image sensor (e.g., color camera) that captures an image or picture that may be blurred, but includes data as described above (i.e., known trajectories of pixels and overlapping trajectories). As such, embodiments of the present disclosure are not limited to a combination of 3D imaging and 2D image capture/reconstruction, but rather the above described embodiments are merely for explanatory purposes of a relatively more complex system (3D+2D scanning/imaging).

Further, as noted, embodiments of the present disclosure are not merely limited to color (visible wavelength) image reconstruction. The image capture devices that collect image data in accordance with the present disclosure may be any type of camera, e.g., black and white, infrared, etc. As such, the present disclosure is not merely limited to color image reconstruction, but rather is directed to image reconstruction of image data collected at an image sensor that include the image data that has known trajectories and overlapping trajectories.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently (or simultaneously), or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of capturing image information of an environment using a laser scanner having a rotatable mirror configured and disposed to receive light from the environment and to direct at least a portion of the received light onto an imaging camera of the laser scanner, the mirror being rotatable relative to the imaging camera, the imaging camera being stationary relative to a rotational axis of the mirror, the method comprising:
   rotating the mirror relative to the imaging camera; and
   capturing, via the imaging camera, an image containing image information of the received light;
   wherein each pixel of the image contains image information of an accumulation of the received light along a corresponding individual trajectory during the defined duration of the mirror rotation, wherein each individual trajectory is created from a shutter event wherein a start point of the individual trajectory corresponds to an opening of a shutter of the camera during the shutter event and an end point of the individual trajectory corresponds to a closing of the shutter of the camera during the shutter event, and
   wherein each individual trajectory has a trajectory that crosses another of the individual trajectories within the image.

2. The method of claim 1, further comprising synchronizing an exposure time of the imaging camera with a defined duration of the mirror rotation such that the image information of the image contains an average of the image information corresponding to the defined duration of the mirror rotation.

3. A method of capturing image information of an environment using a laser scanner having a rotatable mirror configured and disposed to receive light from the environment and to direct at least a portion of the received light onto an imaging camera of the laser scanner, the mirror being rotatable relative to the imaging camera, the imaging camera being stationary relative to a rotational axis of the mirror, the method comprising:
   rotating the mirror relative to the imaging camera;
   capturing, via the imaging camera, an image containing image information of the received light;
   wherein each pixel of the image contains image information of an accumulation of the received light along a corresponding individual trajectory during the defined duration of the mirror rotation, and
   wherein each individual trajectory has a trajectory that crosses another of the individual trajectories within the image; and
   reconstructing the captured image information of the image via a processing circuit response to executable instructions which when executed on the processing circuit solves a system of linear equations $\vec{A}\vec{x}=\vec{b}$ for $\vec{x}$, where:
   $\vec{x}$ is a vector of pixels on the image to be reconstructed;
   $\vec{b}$ is a vector of pixels of the image of captured image information captured by the imaging camera corresponding to the defined duration of the mirror rotation; and
   $\vec{A}$ is a matrix of known trajectory paths for each pixel of the image of captured image information captured by the imaging camera corresponding to the defined duration of the mirror rotation.

4. The method of claim 1, wherein the defined duration is one full rotation of the mirror.

5. The method of claim 1, further comprising capturing three-dimensional data associated with the environment using the laser scanner.

6. The method of claim 5, further comprising correlating the captured image information with the captured three-dimensional data.

7. The method of claim 6, further comprising reconstructing a three-dimensional color map of the environment based on the correlated data.

8. The method of claim 5, wherein the three-dimensional data is time-of-flight data.

9. The method of claim 5, wherein the capturing of the three-dimensional data comprises projecting light at the mirror from within the laser scanner and detecting a reflection of the projected light at a receiver within the laser scanner.

10. The method of claim 9, wherein the projected light is a laser.

11. The method of claim 10, wherein the laser has a wavelength of 780 nm or 1150 nm.

12. The method of claim 5, wherein the laser scanner is rotated about an axis that is perpendicular to the rotational axis of the mirror.

13. The method of claim 12, wherein the rotation of the mirror about the rotational axis of the mirror is greater than the rotation of the laser scanner about the axis perpendicular to the rotational axis of the mirror.

14. The method of claim 1, wherein the imaging camera is one of a color camera, a black-and-white camera, and an infrared camera.

15. The method of claim 1, wherein the imaging camera comprises at least one of a complementary metal-oxide-semiconductor (CMOS) and a charge-coupled device (CCD).

16. The method of claim 1, further comprising moving the laser scanner within the environment during the rotating and capturing operations.

17. A system for capturing image information of an environment, the system comprising:
a housing;
a rotatable mirror arranged within the housing; and
an imaging camera arranged relative to the rotatable mirror to capture light reflected off the rotatable mirror;
wherein the rotatable mirror is configured and disposed to receive light from the environment and to direct at least a portion of the received light onto the imaging camera, the rotatable mirror being rotatable relative to the imaging camera about a rotational axis of the mirror, the imaging camera being stationary relative to the rotational axis of the mirror,
wherein the rotatable mirror and the imaging camera are configured and disposed relative to each other such that the imaging camera captures an image containing image information of the received light while the rotatable mirror is rotating, and
wherein each pixel of the image contains image information of an accumulation of the received light along a corresponding individual trajectory during the defined duration of the rotation, and wherein each individual trajectory has a trajectory that crosses another of the individual trajectories within the image, wherein individual trajectories are created from a shutter event wherein a start point of the respective individual trajectory corresponds to an opening of a shutter of the camera during the shutter event and an end point of the respective individual trajectory corresponds to a closing of the shutter of the camera during the shutter event.

18. The system of claim 17, wherein an exposure time of the imaging camera is synchronized with a defined duration of rotation of the rotatable mirror such that the image information of the image contains an average of the image information corresponding to the defined duration of the rotation.

19. The system of claim 17, further comprising a processing circuit response to executable instructions which when executed on the processing circuit solves a system of linear equations $\vec{\vec{A}}\,\vec{x}=\vec{b}$ for $\vec{x}$ to reconstruct the captured image information of the image, where:

$\vec{x}$ is a vector of pixels on the image to be reconstructed;

$\vec{b}$ is a vector of pixels of the image of captured image information captured by the imaging camera corresponding to the defined duration of the mirror rotation; and $\vec{\vec{A}}$ is a matrix of known trajectory paths for each pixel of the image of captured image information captured by the imaging camera corresponding to the defined duration of the mirror rotation.

20. The system of claim 17, further comprising:
a light emitter arranged within the housing and configured to project a projected light at the rotatable mirror; and
a light receiver arranged to receive a reflection of the projected light.

21. The system of claim 20, wherein the light receiver is configured to capture three-dimensional data associated with the environment based on the reflected projected light.

22. The system of claim 21, further comprising a processing circuit configured to correlate the captured image information with the captured three-dimensional data.

23. The system of claim 22, further comprising a processing circuit configured to reconstruct a three-dimensional color map of the environment based on the correlated data.

24. The system of claim 21, wherein the three-dimensional data is time-of-flight data.

25. The system of claim 20, wherein the projected light is a laser.

26. The system of claim 17, wherein the housing is rotated about an axis that is perpendicular to the rotational axis of the mirror.

27. The system of claim 26, wherein the rotation of the mirror about the rotational axis of the mirror is greater than the rotation of the housing about the axis perpendicular to the rotational axis of the mirror.

28. The system of claim 17, wherein the imaging camera is one of a color camera, a black-and-white camera, and an infrared camera.

29. The system of claim 17, wherein the imaging camera comprises at least one of a complementary metal-oxide-semiconductor (CMOS) and a charge-coupled device (CCD).

* * * * *